(12) United States Patent
Shima

(10) Patent No.: US 7,324,224 B2
(45) Date of Patent: Jan. 29, 2008

(54) PRINTER FOR MANAGING A PLURALITY OF PRINT JOB DATA

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 773 days.

(21) Appl. No.: 09/810,949

(22) Filed: Mar. 16, 2001

(65) Prior Publication Data

US 2002/0001104 A1    Jan. 3, 2002

(30) Foreign Application Priority Data

Mar. 16, 2000  (JP)  ............................ 2000-074763
Mar. 24, 2000  (JP)  ............................ 2000-084172

(51) Int. Cl.
*G06K 15/00* (2006.01)
*H04N 1/32* (2006.01)

(52) U.S. Cl. ..................... 358/1.15; 358/468

(58) Field of Classification Search ............. 358/1.13, 358/1.15, 1.9, 1.16, 1.6; 709/201, 223, 224
See application file for complete search history.

(56) References Cited

U.S. PATENT DOCUMENTS

| 5,592,683 | A | * | 1/1997 | Chen et al. ................... 710/52 |
| 5,619,649 | A | | 4/1997 | Kovnat et al. |
| 5,633,992 | A | * | 5/1997 | Gyllenskog ................ 358/1.15 |
| 5,638,511 | A | | 6/1997 | Nezu .................... 395/187.01 |
| 5,727,135 | A | | 3/1998 | Webb et al. |
| 5,754,747 | A | * | 5/1998 | Reilly et al. ............... 358/1.15 |
| 5,859,711 | A | * | 1/1999 | Barry et al. ................ 358/296 |
| 5,873,659 | A | | 2/1999 | Edwards et al. ............. 400/61 |
| 6,130,757 | A | | 10/2000 | Yoshida et al. |
| 6,148,346 | A | * | 11/2000 | Hanson ..................... 719/321 |
| 6,181,436 | B1 | * | 1/2001 | Kurachi .................... 358/1.15 |
| 6,421,136 | B2 | * | 7/2002 | Yamamoto ................ 358/1.15 |
| 6,894,792 | B1 | | 5/2005 | Abe |

FOREIGN PATENT DOCUMENTS

| EP | 0 595 594 A1 | 5/1994 |
| JP | 5-61617 | 3/1993 |
| JP | 6-223021 | 8/1994 |
| JP | 8-156342 | 6/1996 |

(Continued)

OTHER PUBLICATIONS

European Search Report dated Jan. 20, 2003, 3 pages.

(Continued)

*Primary Examiner*—Jerome Grant, II

(57) ABSTRACT

The respective ones of a plurality of print job data (jobs) thrown in the printer are independently managed according to job identifying information. The job management signifies, for example, to grasp the progressive states of the jobs and present them to a user or give a predetermined command (cancel command, etc) to a particular job. In the printer connected to an exclusive interface, such as a serial interface, a parallel interface or a USB interface, print job data is extracted, on a job-unit basis, from among a series of reception data received from the host machine. Job identifying information is assigned to the extracted print job data. Also, in the printer connected to a network, job identifying information is assigned to the reception data received from the host machine and logically distinguished as print job data.

28 Claims, 24 Drawing Sheets

FOREIGN PATENT DOCUMENTS

| | | |
|---|---|---|
| JP | 8-305520 | 11/1996 |
| JP | 9-255207 | 9/1997 |
| JP | 9-265365 | 10/1997 |
| JP | 10-58788 | 3/1998 |
| JP | 11-105381 | 4/1999 |
| JP | 11-149354 | 6/1999 |
| JP | 11-19087 | 7/1999 |
| JP | 11-338655 | 12/1999 |
| WO | WO 00/11544 | 3/2000 |

OTHER PUBLICATIONS

English translation of Notice of Reason for Refusal dated Dec. 20, 2002, 3 pages.

English translation of Japanese Application No. 11-149354 filed Jun. 2, 1999, 16 pages.

English translation of Japanese Application No. 11-105381 filed Apr. 20, 1999, 36 pages.

English translation of Japanese Application No. 11-191087 filed Jul. 13, 1999, 26 pages.

English translation of Japanese Application No. 6-223021 filed Aug. 12, 1994, 16 pages.

English translation of Japanese Application No. 5-61617 filed Mar. 12, 1993, 11 pages.

English translation of Notice of Reason for Refusal dated Nov. 26, 2002, 4 pages.

English translation of Japanese Application No. 10-58788 filed Mar. 3, 1998, 18 pages.

English translation of Japanese Application No. 11-338655 filed Dec. 10, 1999, 27 pages.

English translation of Japanese Application No. 8-305520 filed Nov. 22, 1996, 30 pages.

English translation of Japanese Application No. 9-265365 filed Oct. 7, 1997, 27 pages.

Patent Abstracts of Japan, Publication No. 09-255207; Sep. 30, 1997, 1 page.

International Search Report issued in Int'l Application No. PCT/US99/18737 mailed on Jan. 12, 2000, 2 pgs.

Appeal Examiner's Inquiry dated Jul. 29, 2005 with English translation (6 pages).

Patent Abstracts of Japan; Publication No. 08-156342 dated Jun. 18, 1996 (2 pages).

English Translation of JP-8-156342 (15 pages).

Communication Pursuant to Article 96(2) EPC from the EPO dated Apr. 27, 2006 (5 pages).

* cited by examiner

FIG.4

| JOB LANGUAGE | START-END PATTERN DATA | END-EDGE PATTERN DATA |
|---|---|---|
| ESC/PAGE | ^[^A@EJL | ^[^A@EJL |
| PostScript | ^[%-12345X@EJL ENTER LANGUAGE = POSTSCRIPT | ^D |
| PCL4/PCLXL | ^[%-12345X@EJL JOB | ^[%-12345X |
| PCL3 | ^[E | FF0x |

```
1:    ^[^A@EJL[LF]                                                      51
2:    @EJL SJ ID=Windows_NT[LF]
3:    @EJL SE LA=ESC/PAGE[LF]
4:    @EJL SET RS=QK PU=AU PS=A4 ZO=OFF EC=ON OU=FD
      SZ=OFF RI=ON SN=OFF DL=3 SL=YES DX=OFF TO=OMM
      LO=OMM[LF]
5:    @EJL EN LA=ESC/PAGE[LF]

:                                                    52
                   :

16:   ^[rhE^[^A@EJL[LF]                                                 53
17:   ^[^A@EJL[LF]
18:   @EJL EJ[LF]
19:   ^[^A@EJL[LF]
```

FIG.6A

| | |
|---|---|
| 1: | ^[%-12345X@PJL ENTER LANGUAGE = POSTSCRIPT[LF] |
| 2: | %Epson[LF] |
| 3: | %EPL-7500[LF] |
| 4: | /A{[LF] |
| 5: | /RotationAngle 4 def[LF] |
| | : |
| | : |
| | : |
| 16: | showpage[LF] |
| 17: | ^D[LF] |

FIG.6B

| PJL | PostScript | ^D |
|---|---|---|

FIG.10

| JOB INFORMATION | JOB IDENTIFYING INFORMATION | STATUS OF RECEPTION | STATUS OF IMAGE GENERATION | STATUS OF PRINT |
|---|---|---|---|---|
| dfA927HCAT8KL01 | 2-P | Done | Done | Printing |
| dfA232HCAT8KL01 | 3-LPR | Done | Imaging | Waiting |
| dfA563HCAT8KL01 | 4-P | Done | Waiting | Waiting |
| dfA563HCAT8KL01 | 5-USB | Receiving | Waiting | Waiting |

FIG.19

|  | CONDITION | STATE |
|---|---|---|
| Receiving | DATA RECEPTION | Receiving |
|  | DATA RECEPTION END | Done |
| Imaging | WAITING FOR JOB | Waiting |
|  | JOB IMAGING START | Imaging |
|  | JOB IMAGING END | Done |
| Printing | WAITING FOR JOB | Waiting |
|  | TOP PAGE PRINT START | Printing |
|  | LAST PAGE PRINT END | Done |

FIG.20

| JOB INFORMATION | JOB IDENTIFYING INFORMATION | STATUS OF RECEPTION | STATUS OF IMAGE GENERATION | STATUS OF PRINTING |
|---|---|---|---|---|
| dfA927HCAT8KL01 | 2 | Done | Done | Done |
| dfA232HCAT8KL01 | 3 | Done | Imaging | Printing |
| dfA563HCAT8KL01 | 4 | Receiving | Waiting | Waiting |

FIG.23

| No. | JobID | Receiving | Imaging | Printing | CurQty,Cur,Total,Printed,Sinplex.Color |
|---|---|---|---|---|---|
| 84 | dfA578HCAT70001 - - | Done | Done | Done | 1, 1, 1, 1, 1, 0 |
| 85 | dfA150HCET8KL01 - - | Done | Done | Done | 1, 1, 1, 1, 1, 0 |
| 86 | dfA523HCET8KL01 - - | Done | Done | Done | 1, 1, 1, 1, 1, 0 |
| 87 | dfA887HCAT8KL01 - - | Done | Done | Done | 1, 1, 1, 1, 1, 0 |
| 88 | dfA204HCAT8KL01 - - | Done | Done | Done | 1, 1, 1, 1, 1, 0 |

Job Detail Information

| id | value |
|---|---|
| Id | 2 |
| Printer | sapporo |
| Machine | ¥¥HCET8KL01 |
| User | sima |
| Document | http://www.yahoo.co.jp/ |
| Driver | EPSON LP-8200C |
| Priority | 1 |
| Date | 1999/1021/19 42/50 |
| Cusom | |
| PrintSetting | 1 |

Consumption/ black, 31906, μg
A4, Plain, 1

Errors/ no error spy Interval none

Refresh
Get Info
Job Cancel

FIG. 24

| | | | | | | | | | | |
|---|---|---|---|---|---|---|---|---|---|---|
| File (F) | Edit (E) | View (V) | Jump (G) | Help (H) | | | | | | | http://xxx.printer1/

Ready — online data cont — go pause reset — none — count ff warm — refresh

StatusSheet   FontSample   _____   Send

Job Control Panel

| No. | JobID | Receiving | Imaging | Printing | CurQty,Cur,Total,Printed,Sinplex.Color |
|---|---|---|---|---|---|
| 84 | dfA578HCAT70001 - - Done | | Done | Done | 1, 1, 1, 1, 1, 0 |
| 85 | dfA150HCET8KL01 - - Done | | Done | Done | 1, 1, 1, 1, 1, 0 |
| 86 | dfA523HCET8KL01 - - Done | | Done | Done | 1, 1, 1, 1, 1, 0 |
| 87 | dfA887HCAT8KL01 - - Done | | Done | Done | 1, 1, 1, 1, 1, 0 |
| 88 | dfA204HCAT8KL01 - - Done | | Done | Done | 1, 1, 1, 1, 1, 0 |
| 89 | dfA211HCAT700001 - - Done | | Done | Done | 1, 4, 4, 4, 4, 0 |
| 90 | dfA927HCAT8KL01 - - Done | | Done | Printing | 1, 1, 1, 0, 0, 0 |
| 91 | dfA232HCAT8KL01 - - Done | | Done | Printing | 1, 1, 1, 0, 0, 0 |
| 92 | dfA563HCAT8KL01 - - Done | | Done | Waiting | 0, 0, 1, 0, 0, 0 |
| 93 | dfA951HCAT8KL01 - - Done | | Done | Waiting | 0, 0, 1, 0, 0, 0 |
| 94 | dfA675HCAT8KL01 - - Done | | Imaging | Waiting | 0, 0, 0, 0, 0, 0 |

2301

Job Detail Information

| id | value |
|---|---|
| Id | 2 |
| Printer | sapporo |
| Machine | ￥￥HCET8KL01 |
| User | sima |
| Document | http://www.yahoo.co.jp/ |
| Driver | EPSON LP-8200C |
| Priority | 1 |
| Date | 1999/1021/19 42/50 |
| Cusom | |
| PrintSetting | 1 |

2302

Consumption/

2303

Errors/

Feed Jam, Occur, 1, 1
Paper Out Mp A4, Occur, 1, 1
undef, Occur, 1, 1

2304 spy Interval none ▼

Refresh

Get Info

Job Cancel

PRINTER FOR MANAGING A PLURALITY OF PRINT JOB DATA

BACKGROUND OF THE INVENTION

1. Field of the Invention

This invention relates to technologies of printers and, more specifically, to a technology for managing a plurality of jobs thrown from the host machine. A first invention relates to a network-compatible printer connected to a network system such as a LAN, while a second invention to a printer connected to a RAW-mode physical channel, such as a serial interface, a parallel interface and a USB (Universal Serial Bus) interface.

2. Description of the Related Art

The printer has various interfaces for connection to a host machine. There is known as a representative interface a network interface connected to a LAN architected by the Ethernet, or an exclusive interface, such as a serial interface, parallel interface and USB interface. The exclusive interface is distinguished as a physical channel in a RAW mode because of not making data conversion by a protocol stack, such as of the network interface.

The printer having exclusive interface connection receives print data from the host machine while controlling data flow by BUSY and READY signals in accordance with the process capability (i.e. printing speed) such as a use status of the receiving buffer. The printing data is typically supplied in the form of print job data generated by the printer driver on the host machine to the printer. The printer sequentially interprets the print job data stored in the receiving buffer to generate image data for print output, and loads this in the image memory and thereafter supplies to the print engine. This allows the printer to realize print onto a print recording medium, such as a hard paper.

In such exclusive interface connection, the host machine as a transmission source is definite and the control of data flow is at the initiative of the printer. Consequently, the printer merely processes print job data in the reception sequence thereof. That is, even where print job data is next thrown before the completion of the print process on the basis of the print job data first thrown from the host machine, the printer if sequentially processing a series of data can execute the print process without interference without the need to explicitly distinguish the print job data therein.

Meanwhile, the network-compatible printer through a network interface generally has a print server at an inside or outside of the printer. This print server has a print-spooler function to perform network communication with the host machine and accepting print job data once stored in a hard disk unit or the like and thereafter sequentially taken out thereof and forwarded for the print process.

In the meanwhile, there are cases that the user provides a print instruction from the host machine to throw print job data into the printer and thereafter intends to cancel the print process based upon the print job data. Immediately after forwarding the print job data by the host machine, the user can cancel the print job data stored in the hard disk or the like by deleting the print job data stored on the hard disk unit or the like. Meanwhile, after the printer has forwarded the print job data to a print process, the user must forcibly reset the memory content within the printer main body by use of a reset button provided on the printer or power off the printer itself.

Accordingly, there has been inconvenience that, where canceling print after throwing a plurality of print job data into the printer, all the print job data thrown be cleared out of the memory. In other words, it is impossible for such a printer to execute cancellation of particular print job data only.

SUMMARY OF THE INVENTION

It is an object of the present invention to make it possible to independently manage the respective ones of a plurality of print job data (jobs) thrown in the printer. The job management signifies, for example, to grasp the progressive states of the jobs and present them to a user or give a predetermined command (cancel command, etc) to a particular job. The printer is configured by various processing means for carrying out predetermined processes. Printing is realized by carrying out the predetermined processes given to the plurality of processing means. The processing means is typically receiving means to accept a job thrown from the host machine, spooler means, image generating means, print control means and job managing means.

A first invention explains a printer connected to a host machine through an exclusive interface. The exclusive interface means a physical channel in RAW level, such as a serial interface, a parallel interface or a USB interface. The printer extracts, on a job-unit basis, print job data from among a series of reception data received from the host machine and assigns job identifying information to the extracted print job data, thereby managing each of the print job data on the basis of the job identifying information.

A second invention explains a printer connected to a host machine on a network through a network interface. The printer assigns job identifying information to the print job data as jobs received from the host machine, thereby managing each of the print job data on the basis of the job identifying information.

Consequently, according to the invention, job identifying information is issued to the job thrown in the printer. Accordingly, even where a plurality of jobs exist in the printer, the job can be unambiguously identified on the basis of the job identifying information thus making possible to manage each of the jobs.

These inventions are, typically, to be constructed as hardware and/or software (program). Consequently, where constructed as a program, the program cooperates with the hardware to realize an expected function. The program is offered in the form of being held in a memory of RAM or ROM, in addition to a recording medium, e.g. a hard disk (HD), a DVD-RAM, a flexible disk (FD) or a CD-ROM. Meanwhile, the program may be realized including a function to invoke a function as realized by a basic program, such as an operating system.

BRIEF DESCRIPTION OF THE DRAWINGS

FIG. 4 is a figure showing an example of a content of a pattern table according to the embodiment;

FIGS. 6A and 6B is a figure showing an example of print job data;

FIG. 10 is a figure showing an example of a job management table according to the embodiment;

FIG. 19 is a figure for explaining a progress status of jobs;

FIG. 20 is a figure showing an example of a job management table;

FIG. 23 is a figure showing an example of a job management table; and

FIG. 24 is a figure showing an example of a job management table.

DESCRIPTION OF THE PREFERRED EMBODIMENTS

Figure 1:
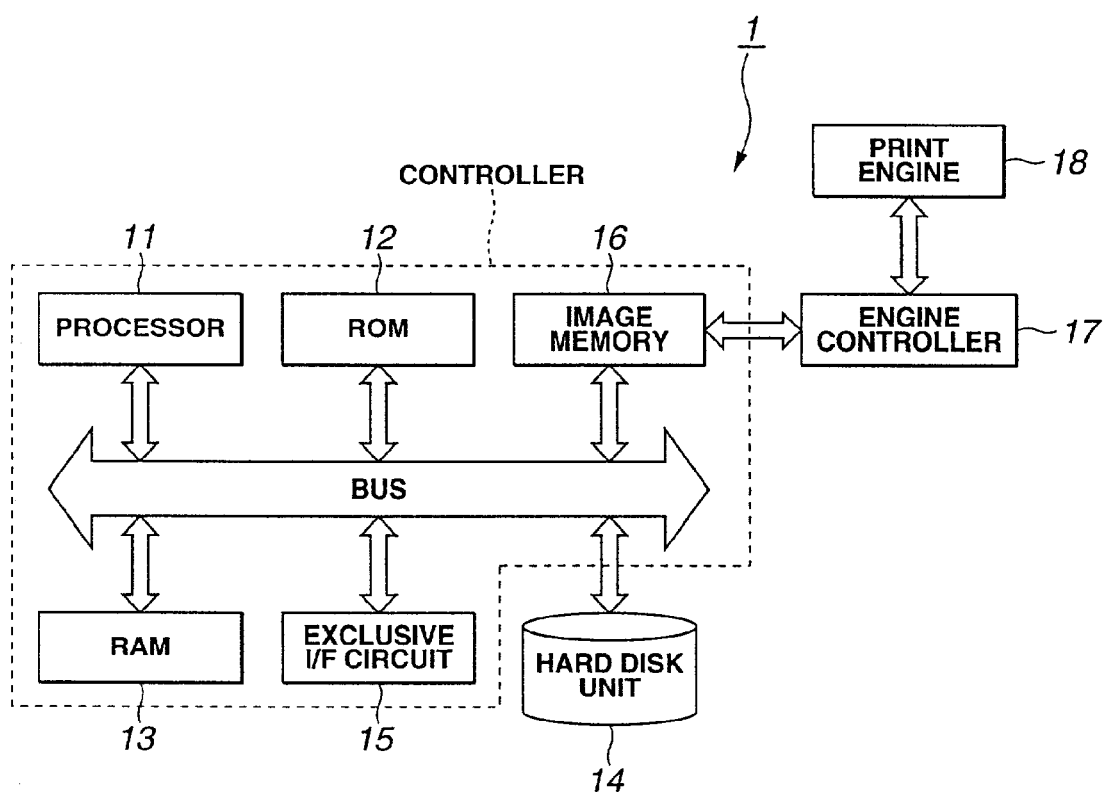
FIG. 1 is a figure showing an example of a hardware configuration of a printer according to the present embodiment.

Embodiments in best mode of the present invention will be explained while referring to the drawings.

(First Invention)

FIG. 1 is a diagram showing an example of a hardware configuration of a printer 1 according to the present embodiment. In the figure, a processor 11 executes various programs stored in a ROM 12 and RAM 13. That is, the execution of various programs by the processor 11, cooperative with other hardware, permits the printer to realize predetermined functions. This embodiment realizes communication function, spool function, image-generation function, print-control function and job management function, as hereinafter described. A hard disk unit 14 stores the print job data forwarded from a host machine 2 through an exclusive interface circuit 15. The host machine, typically, corresponds to a personal computer. The exclusive interface circuit 15 is connected with an exclusive line, such as a parallel cable, to communicate data with the host machine 2. In this embodiment, a parallel interface circuit is provided to enable bidirected communication with the host machine 2. An image memory 16 stores an image data generated on the basis of the print job data. An engine controller 17 reads out the image data loaded in the image memory 16 and supplies it to the print engine 18, while controlling the operation of the print engine 18. The engine controller 17 is stated up by a print execution command, as a trigger, sent from the processor 11, when a predetermined bandwidth of bit-map data, for example, is loaded at the inside of the image memory 16. The print engine 18 is configured with a paper feed mechanism and a print head, for example, in order to make printing on a print recording medium, such as a paper. The print engine 18 may be used suited for the kind of a printer, e.g. a laser printer, a serial printer or the like.

Figure 2:
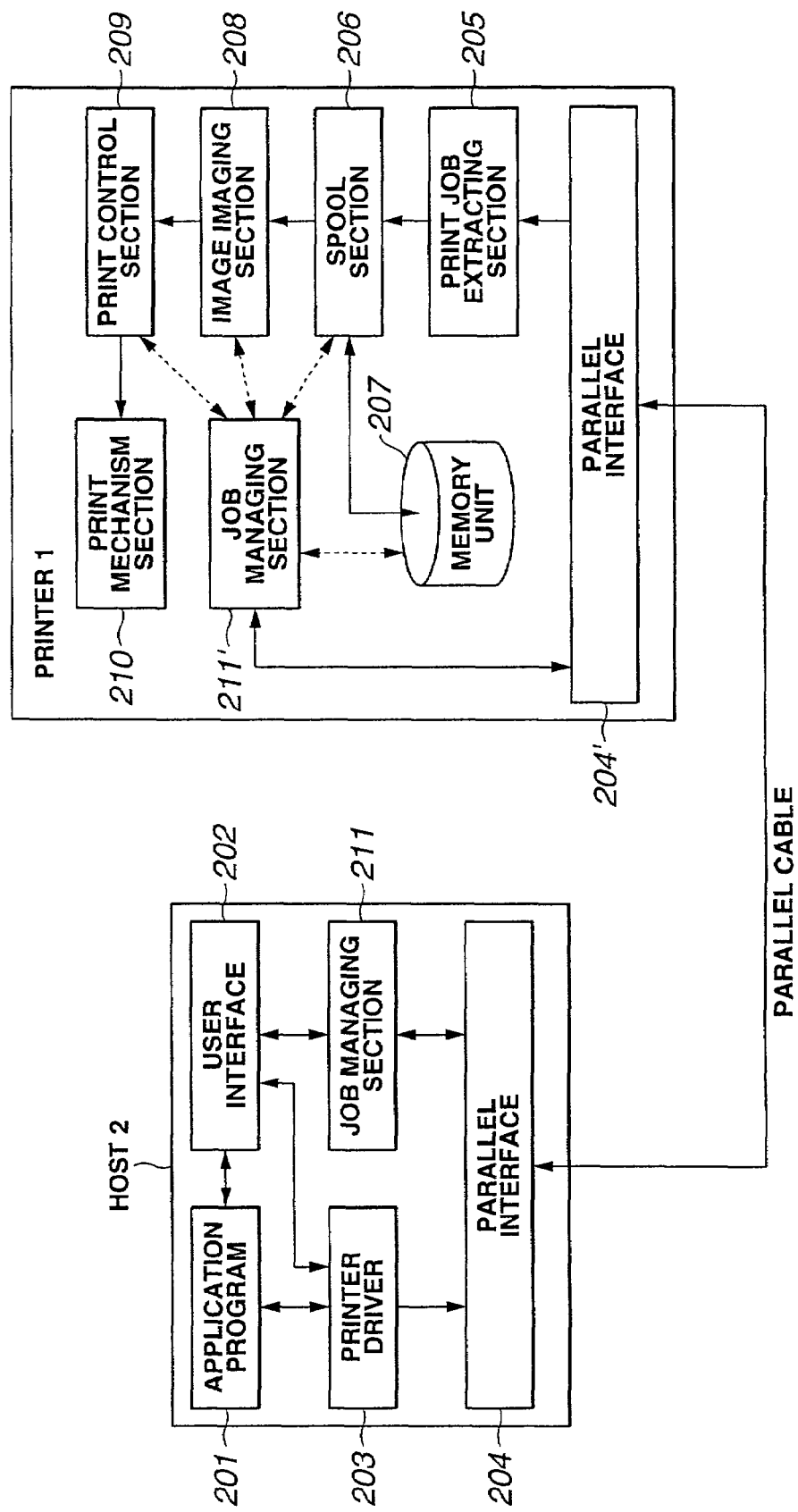
FIG. 2 is a figure for explaining the outline of a print system according to the embodiment.

The printer 1 is in mutual connection with the host machine 2 through the parallel interface circuit, constituting a print system. The printer 1 of this embodiment is connected to the host machine 2 by the parallel interface circuit allowing for bidirected communication. FIG. 2 is a diagram for explaining the outline of a print system according to this embodiment.

An application program 201 is, for example, word processor software to create/edit documents, graphic editor software to create/edit figures, or the like. If now a print command is provided from a user through a user interface 202, the application program 201 invokes a printer driver 203.

The printer driver 203 displays a print dialog box through the user interface 202 and prompts the user to enter predetermined setting items. When a print execution command (e.g. selection of "OK" button) is provided from the user through the user interface 202, the printer driver 203 receives application data (printing data) for printing from the application program 201 and converts the application data into print job data for interpreting (imaging) at the inside of the printer. It is preferred in this case that the printer driver 203 embeds the information related to print job itself (job information) in the output data, in addition to the print commands to be interpreted for normal print by the printer. The job information includes, for example, a document name (file name), a user name, and the like. The printer driver 203 communicates data, i.e. print job data generated based on the application data, in RAW mode with the printer 1 through the parallel interface 204, 204'.

The parallel interface 204' accepts the data, i.e., print job data, transmitted from the host machine 2 and forward it to the print job extracting section 205 while transmitting a control signal to the host machine 2 in accordance with a use status of a reception buffer (not shown) provided in a print job extracting section 205.

The print job extracting section 205 extracts (cuts out) print job data on a job-unit basis from a series of data sent from the parallel interface 204' and assigns job identifying information (job ID) issued to the respective ones of the extracted print job data. The job identifying information is to unambiguously identify a job (print job data and job based thereon) at the inside of the printer 1. Also, the job identifying information preferably includes interface identifying information representing at which exclusive interface reception was made. The print job extracting section 206 further extracts from print job data the job information added by the printer driver 13. The print job extracting section 205 notifies the issued job identifying information and job information to the job managing section 211' and associates print job data with job identifying information and outputs them (e.g. in a form adding to the print job data) to a spool section 206. After outputting the print job data to the spool section 206, the print job extracting section 205 notifies the job managing section 211' of completing the reception.

The spool section 206 outputs the print job data sent from the print job extracting section 205 to a memory unit 207, and reads out the print job data stored in the memory unit 207 in the predetermined order to output it to an image generating section 208. The memory unit 207, typically, corresponds to a hard disk device. Incidentally, the spool section 206 of this embodiment employs a mechanism for increasing the speed of supplying data to the image generating section 208, as hereinafter described.

The image generating section 208 interprets the print job data sent through the spool section 206 and generates image data to be loaded in a not-shown image memory. In this case, the image generating section 208 extracts the job identifying information added on the print job data and notifies imaging, if started, to the job managing section 211'. After loading the image data in the image memory, the image generating section 208 notifies a print request to a print control section 209. This print request contains job identifying information. Interpreting the print job data and completing the generation of image data, the image generating section 208 notifies it to the job managing section 211'.

The print control section 209 instructs a print mechanism section 210 to prepare print on the basis of the print request and notifies the job identifying information to the job managing section 211'. Accepting a completion of print preparation from the print mechanism section 210, the print control section 209 reads out the image data stored in the image memory and supplies it to the print mechanism section 210. The print mechanism section 210 executes print to a print recording medium on the basis of the image data supplied. After supplying image data for the job identifying information, the print control section 209 if receiving a notification of page discharge completion from the print mechanism section 210 notifies the job managing section 211' of a completion of print.

A job managing section 211 provided in the host machine 2 makes communication with the job managing section 211' provided in the printer 1 through the parallel interface 204, 204', realizing job management within the printer 1. That is, the job managing section 211' is an execution entity to manage job on the basis of the print job data thrown in the printer 1. More specifically, the job managing section 211 accepts an instruction from the user through an user interface 202 and forward it as a job manage request to the job managing section 211' within the printer 1. The job managing section 211' in the printer 1 makes processing in compliance with the received job manage request. For example, where receiving a delete request (cancel request) for a particular job, the job managing section 211' deletes all the data for the particular job existing in the printer 1. On the other hand, the job managing section 211' has a function to receive a job progress status from the print job extracting section 205, image generating section 206 and print control section 209 and notify it to the job managing section 211 in the host machine 2.

Figure 3:
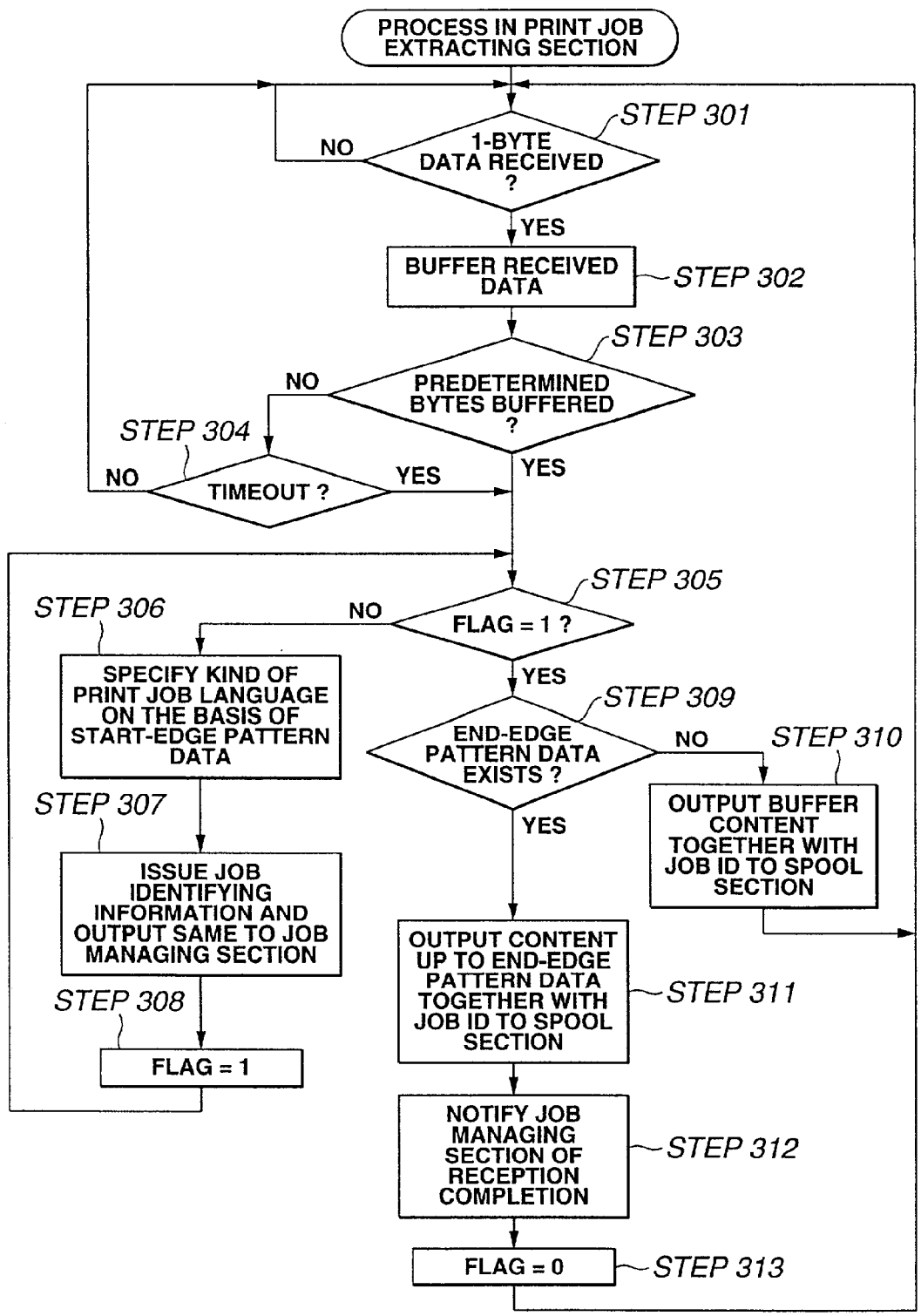
FIG. 3 is a flowchart for explaining the operation of a print job extracting section according to the embodiment.

FIG. 3 is a flowchart for explaining the operation in the print job extracting section according to this embodiment. The print job extracting section 205 is to extract print job data on a job-unit basis from among a series of the data transmitted from the host machine 2 through the parallel interface 204, 204', as described before. The print job extracting section 205 also assigns job identifying information to the extracted print job data.

In the figure, the print job extracting section 205 if first receiving 1-byte data through the parallel interface 204' (STEP 301) temporarily stores the received 1-byte data to the receiving buffer (STEP 302). The print job extracting section 205 makes the following processes when predetermined bytes (e.g. 256 bytes) of data are stored to the receiving buffer (Yes in STEP 303) or time out occurs (Yes in STEP 304).

That is, the print job extracting section 205 determines whether a flag value is "1" or not (STEP 305). This flag is representative of new print job data or print job data under processing. This value when "1" for example represents print job data under processing. The print job extracting section 205, when determining the flag value as not "1" (e.g. "0"), makes reference to a pattern table as shown in FIG. 4 and extracts start-edge pattern data out of the content of the receiving buffer. The print job extracting section 205 determines a language kind of the print job data on the basis of the extracted start-end pattern data and makes reference to the pattern table shown in FIG. 4 to acquire end-edge pattern data for the job language (STEP 306). Next, the print job extracting section 205 issues job identifying information and notifies it to the job managing section 211' (STEP 307). Then, the print job extracting section 205 alters the flag value to "1" in order to show that the print job data is under processing (STEP 308) and moves to Step 305.

Next, the print job extracting section 205 determines the flag value "1" (Yes in STEP 305) and determines whether the end-edge pattern data of the job language specified in the STEP 306 is included in the receiving buffer or not (STEP 309). When determining the end-edge pattern data is not included, the print job extracting section 205 outputs the content of the receiving buffer, together with the job identifying information, to the spool section 206 (STEP 310). Due to this, the print job extracting section 205 returns to the STEP 301 to repeat the above process until finding end-edge pattern data in the content of the receiving buffer.

In STEP 309, the print job extracting section 205 when determining end-edge pattern data is included in the content of the receiving buffer outputs a content up to the end-edge pattern data, together with the job identifying information, to the spool section (STEP 311). Herein, the print job extracting section 205 rearranges the content of the receiving buffer to move a portion not outputted of the content of the receiving buffer to a top in the receiving buffer. Then, the print job extracting section 205 notifies a completion of reception to the job managing section 211' (STEP 312) and resets the flag value to "0" in order to prepare for new print job data (STEP 313). Incidentally, when interrupted due to cancel notification from the hereinafter-referred job managing section 211, the print job extracting section 205 suspends the process.

In this manner, a series of data temporarily stored in the receiving buffer is extracted as print job data on a job-unit basis.

Figures 5A, 5B:
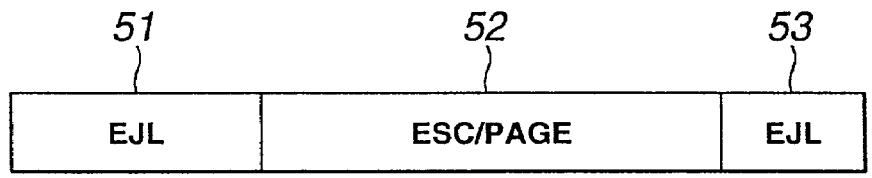
FIGS. 5A and 5B are a figure showing an example of print job data.

For example, it is assumed that the printer 1 receives such print job data as shown in FIG. 5 from the host machine 2. Incidentally, in the same FIG. 5A are given line numbers for the convenience of explanation.

This print job data is in a job language called so-called "ESC/PAGE". The print job data in the ESC/PAGE language is typically configured with EJL (Epson Job Language) data and ESC/PAGE data main body. The EJL data is the data for print control to the printing data and configured in a form bundling at front and rear of the ESC/PAGE data main body as shown in the same FIG. 5B. The print job data of this embodiment includes start-end pattern data to represent a start of print job data and as EJL data (line 1), an ESC/PAGE start command to represent a transition from an EJL header 51 to an ESC/PAGE data main body 52 (line 5), an ESC/PAGE escape command to represent to return from the ESC/PAGE data main body to EJL data (EJL footer 53) ("^[^A@EJL" on line 16) and an end-edge pattern data to represent a termination of the print job data (line 19).

That is, the print job extracting section 205 searches for start-edge pattern data when the data received through the parallel interface 204 is accumulated to predetermined bytes in the receiving buffer. In this embodiment, the print job extracting section 205 recognizes to become receiving print job data in the ESC/PAGE language because "^[^A@EJL" is searched. When finding end-edge pattern data "^[^A@EJL" of the ESC/PAGE-languaged print job data, the print job extracting section 205 recognizes that point as an end of the print job data. This makes it possible to extract print job data on a job-unit basis from among a series of data. Incidentally, FIG. 6 is a figure showing an example of print job data in a PostScript language. In the case of the PostScript language or other job language, print job data will be similarly extracted on a job-unit basis on the basis of the start-edge and end-edge pattern data thereof.

Figure 7:
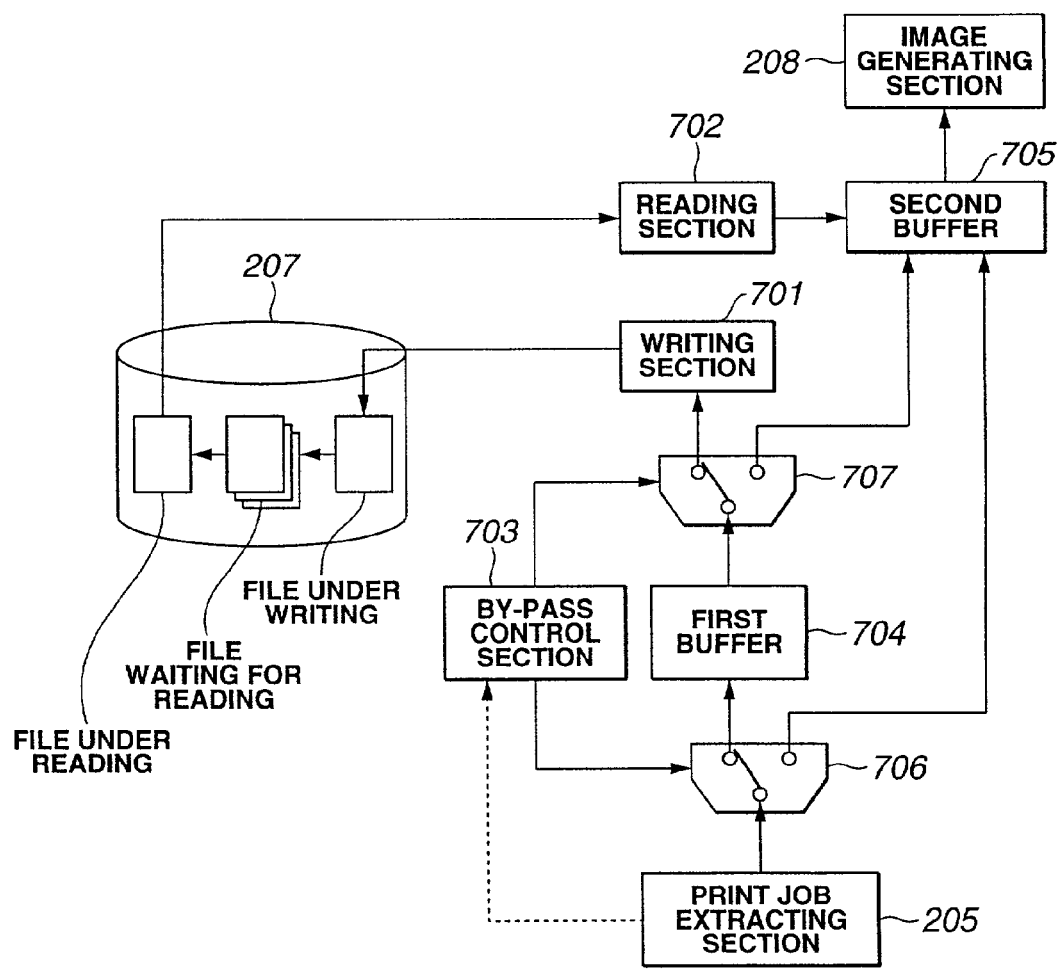
FIG. 7 is a block diagram for explaining a detailed functional configuration of a spool section according to the embodiment.

FIG. 7 is a block diagram for explaining a detailed configuration in function of the spool section according to this embodiment. The spool section 206 typically writes as a file the print job data sent, together with job identifying information, in amount of a predetermined memory-block unit (predetermined bytes) per time from the print job extracting section 205 to the memory unit 207 by a writing section 701, and reads out the print job data stored in the memory unit 207 in a first-in-first-out (FIFO) order by a reading section 702 and outputs it to the image generating section 208. It is noted in this embodiment that the spool section 207 is configured to supply print job data in accordance with a vacant status of buffers provided in the forward and rearward stages of the memory unit 207 without routing through the memory unit 207.

When outputting the content of the receiving buffer, the print job extracting section 205 notifies it to a by-pass control section 703. The by-pass control section 703 determines whether or not there is a memory block under use in a first buffer 704, whether or not there is a vacant memory block in a second buffer 705, or whether or not there is a remaining file in the memory unit 208.

In any of the cases that a memory block under use exists in the first buffer, a remaining file exists in the memory unit 207 and no vacant memory block exists in the second buffer memory 703, the by-pass control section 703 controls selectors 706 and 707 to supply data by way of the memory unit 207.

On the other hand, where a memory block under use exists in the first buffer 704, a vacant memory block exists in the second buffer 705 and no remaining file exists in the memory unit 207, the by-pass control section 703 controls the selector 706 to directly supply data to the second buffer. Furthermore, at a time that no vacant memory block becomes existing in the second buffer 705, the by-pass control section 703 controls the selectors 706 and 707 to supply data to the second buffer by way of the first buffer 704. When no vacant memory block becomes existing in the first buffer 704, the by-pass control section 703 controls selector 706 to supply data by way of the memory unit 207.

Figure 8:
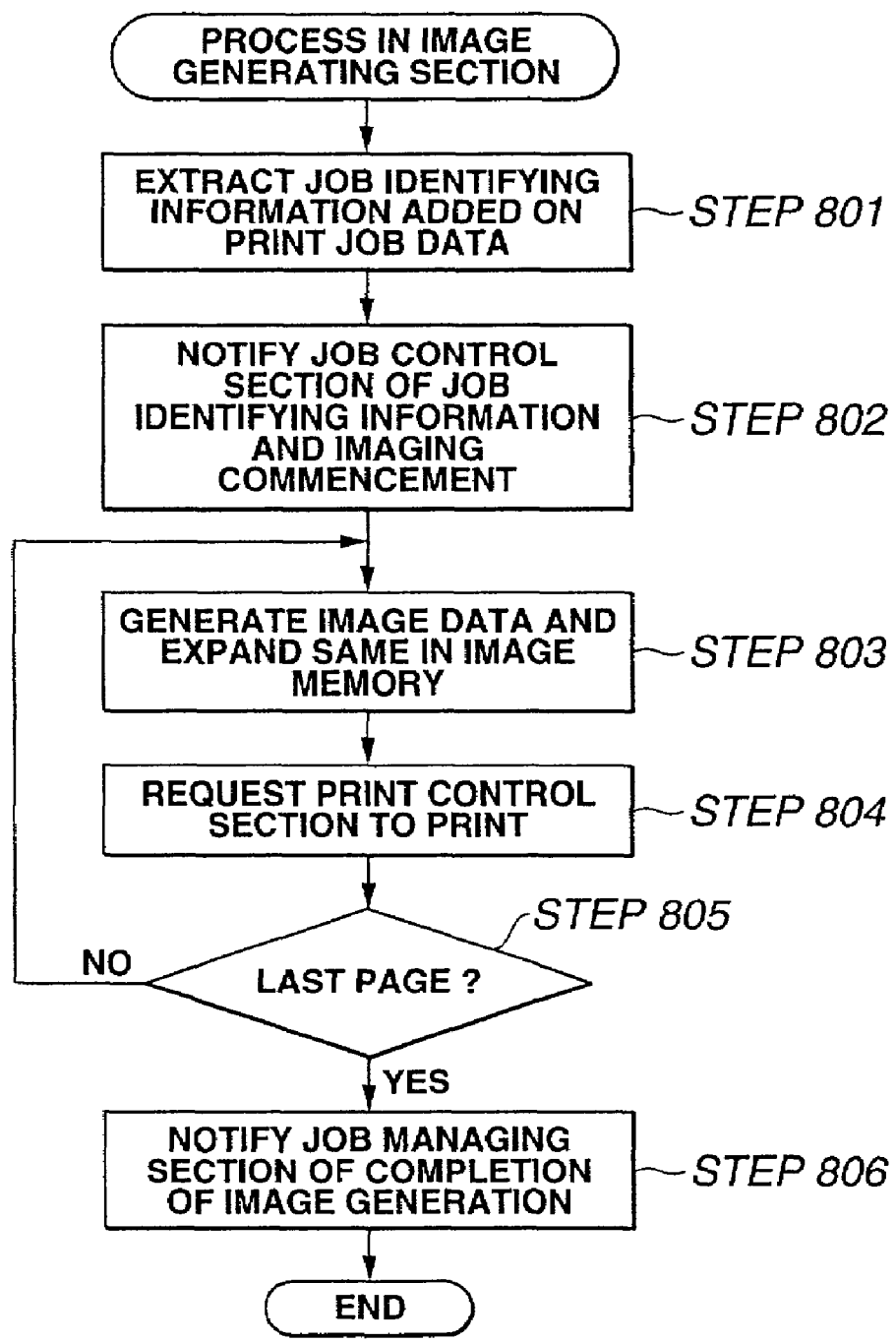
FIG. 8 is a flowchart for explaining the operation of an image generating section according to the embodiment.

FIG. 8 is a flowchart for explaining the operation of the image generating section 208 according to this embodiment. The image generating section 208 is started up upon receiving newly print job data through the spool section 206. Also, the image generating section 208 suspends the process when there is an interruption due to cancel notification from the job managing section 211, as hereinafter described.

The image generating section 207 first extracts job identifying information from received print job data (STEP 801) and notifies the job identifying information and imaging commencement to the job managing section 211' (STEP 802). Next, the image generating section 208 images the print job data to generate image data and writes it in the image memory (STEP 803). writing the image memory in amount of a predetermined bandwidth amount (e.g. an amount of one page), the image generating section 208 forwards a print request to the print control section 210 (STEP 804). Due to this, the image data wrote in the image memory is to be read out under control of the print control section 209. The image generating section 208 repeats the process of the STEPs 803 and 804 until an image data is completed in generation based on the print job data. Where it is determined that the final data has been written (Yes in STEP 805), the image generating section 208 notifies the job managing section 211' of the completion of image generation and ends the process (STEP 806).

Figure 9:
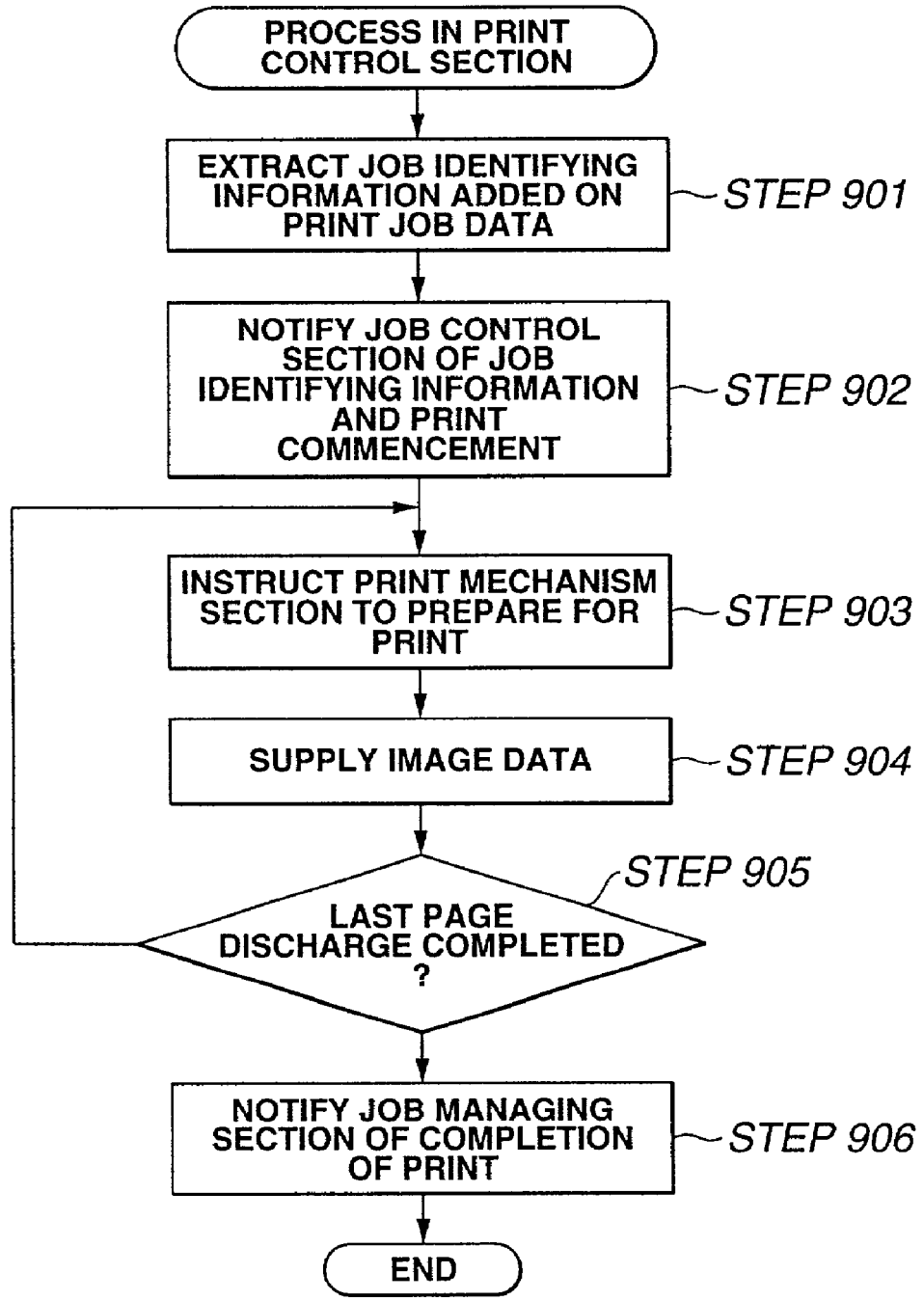
FIG. 9 is a flowchart for explaining the operation of a print control section according to the embodiment.

FIG. 9 is a flowchart for explaining the operation of the print control section 209 according to this embodiment. The print control section 209 is started up upon receiving a print request from the image generating section 208. Receiving a print request from the image generating section 208, the print control section 209 first extracts the job identifying information added on the image data (STEP 901) and notifies the job managing section 211' of the job identifying information and commencement of print (STEP 902). The print control section 209 instructs the print mechanism section 211 to prepare for print (STEP 903), and receives a completion of print preparation from the print mechanism section 210 to read image data out of the image memory and supply it to the print mechanism section 210 (STEP 904). The print control section 209 repeats the process of the STEPs 903 and 904 until receiving a completion of discharging the final page from the print mechanism section 210. The print control section 209, if receiving a completion of discharging the final page from the print mechanism section 210 (Yes of STEP 905), notifies a print end to the job managing section 211'.

In this manner, the print job extracting section 205, the image generating section 208 and the print control section 209 of the invention each notifies the job managing section 211' of a progress status of their own. This enables the job managing section 211' to manage on a progress state of a job thrown into the printer 1 in respect of the respect processes of reception, image generation and print.

The job managing section 211' holds a job management table because of managing the job progress status on the basis of the job thrown therein. FIG. 10 is a figure showing an example of job management table. As shown in the figure, the jobs thrown in the printer 1 is held in their progress statuses on the basis of each of the job identifying information. The job identifying information is configured with an identification no. and interface identifying information. The interface identifying information represents through which interface the print job data has been received. For example, if interface identifying information following an identification no. is "P", it represents that the print job data has been received through the parallel interface. If "LPR", the reception has been through the network interface. Incidentally, the job management table may hold detailed information about the job in addition to the job progress status. The detailed information about job includes, for example, print count, toner consumption quantity, error information and so on.

Figure 11:
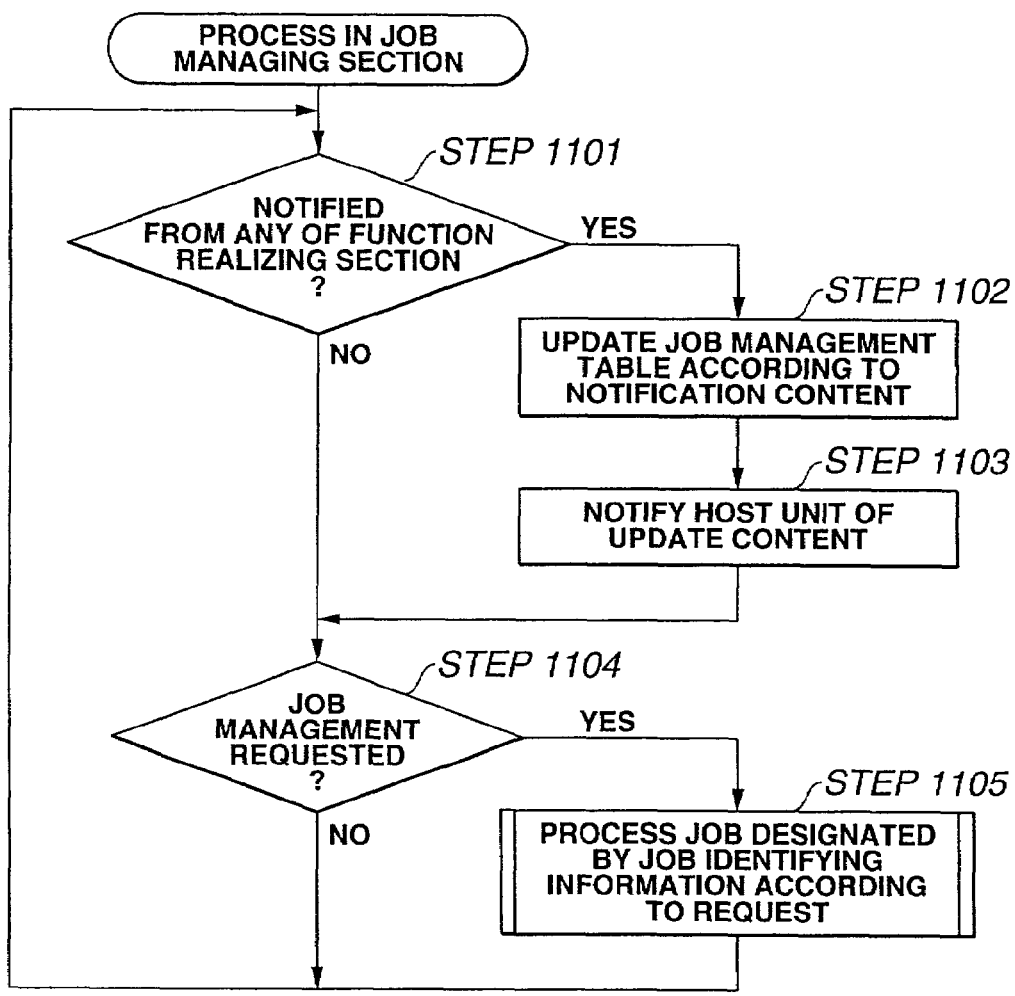
FIG. 11 is a flowchart for explaining the operation of a job managing section according to the embodiment.

FIG. 11 is a flowchart for explaining the operation of the job managing section 211' according to this embodiment. The job managing section 211', when receiving a notification from any of the print job extracting section 205, the image generating section 208 and the print control section 209 (Yes of STEP 1101), updates the job management table according to the content of the notification (STEP 1102). For example, receiving job identifying information and job information from the print job extracting section 204, the job managing section 211' registers the job in the job management table and puts the progress status of the job in "Receiving" state. After updating the job managing table, the job managing section 211' notifies the host machine of the content of update as job management information (STEP 1103). The job managing section 211 in the host machine, if accepts the job managing information, controls the user interface section 202 to make it as on-screen display of job management.

Meanwhile, the job managing section 211', if accepts a job management request from the host machine 2 (Yes of STEP 1104), specifies job identifying information from the job information contained in the job management request and makes a process for the job designated by the job identifying information according to the request. For example, in the case that the job management request is a request to acquire job management information, the job managing section 211' notifies the content of job management table to the requesting host machine 2. Where the job management request is a job cancel (print suspend) request, the job managing section 211' controls to delete all the data on the job existing in the printer.

Figure 12:
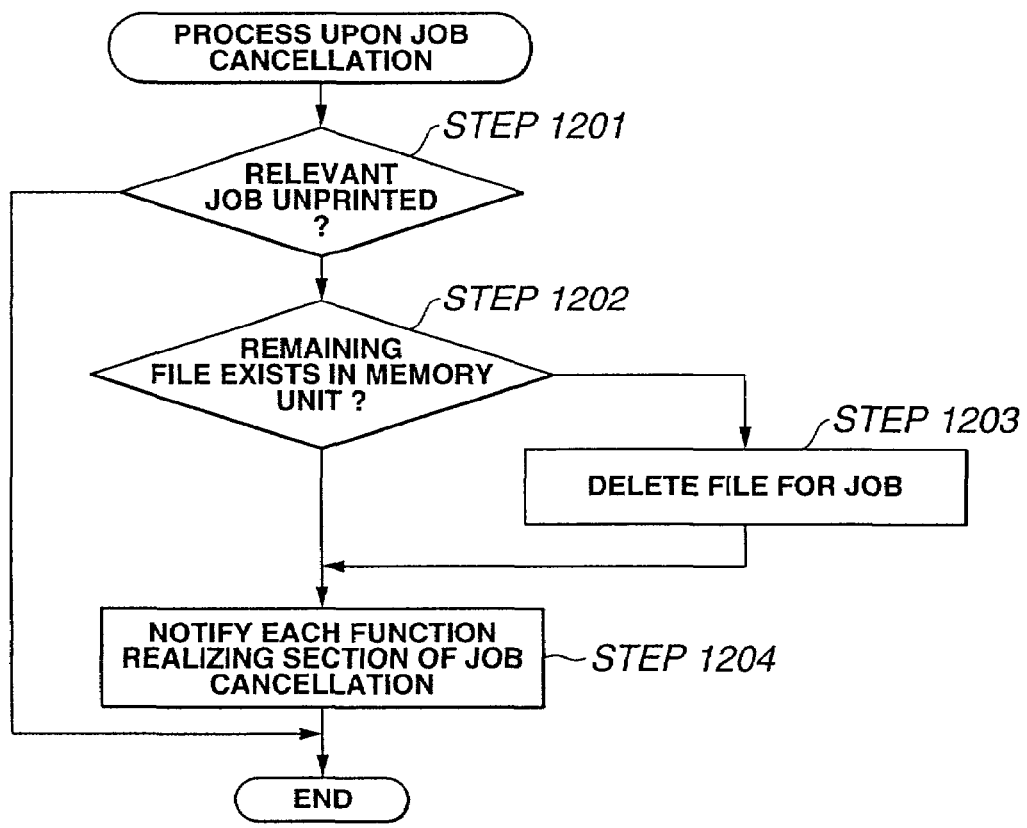
FIG. 12 is a flowchart for explaining the operation upon job cancellation in the job managing section according to the embodiment.

FIG. 12 is a flowchart for explaining the operation during job cancellation by the job managing section 211' according to this embodiment. In the figure, the job managing section 211', if accepting a cancel of job as job management request from the host machine, makes reference to the job management table and determines whether the job to be cancelled is completed in printing or not (STEP 1201). Where determining the job not yet completed in printing, the job managing section 211' then determines whether there exists as a file the print job data for the relevant job in the memory unit 207 or not (STEP 1202). Where determining the presence of a file left in the memory unit 207, the job managing section 211' deletes the relevant file (STEP 1203). Then, the job managing section 211' notifies a cancel command to the print job extracting section 205, the image generating section 208 and the print control section 209 (STEP 1204). The cancel command contains the job identifying information for the job to be cancelled. The notified print-job receiving section 206, image generating section 208 and print control section 209 will not process the data concerning the job as designated by the job identifying information. Incidentally, The job managing section 211' preferably notifies first the print control section 209 of the cancel command. This is due to physically reducing the consumption of expendable supplies, such as papers, to a minimum extent.

As above, according to the present embodiment, where receiving as a series of data a plurality of print job data through a physical channel in RAW mode such as a parallel interface, print job data can be extracted on a job-unit basis out of the series of data. Also, according to this embodiment, because job identifying information is assigned to the extracted print job data, print job data can be unambiguously identified at the inside of the printer. Accordingly, even where a plurality of jobs are thrown in the printer through the physical channel in RAW mode, it is possible to carry out management, e.g. cancellation, of the jobs on a job-by-job basis.

Incidentally, although the foregoing embodiment explained the parallel interface as an example, explanation is similar to the use of an exclusive interface, e.g. serial interface and USB interface. Furthermore, the printer may be connected to the host machine through such various ones of exclusive interfaces. Moreover, the printer according to this embodiment may be connected to LAN as architected by the Ethernet through a network interface, in addition to connection to the host machine through the exclusive interface.

(Second Embodiment)

Figure 13:
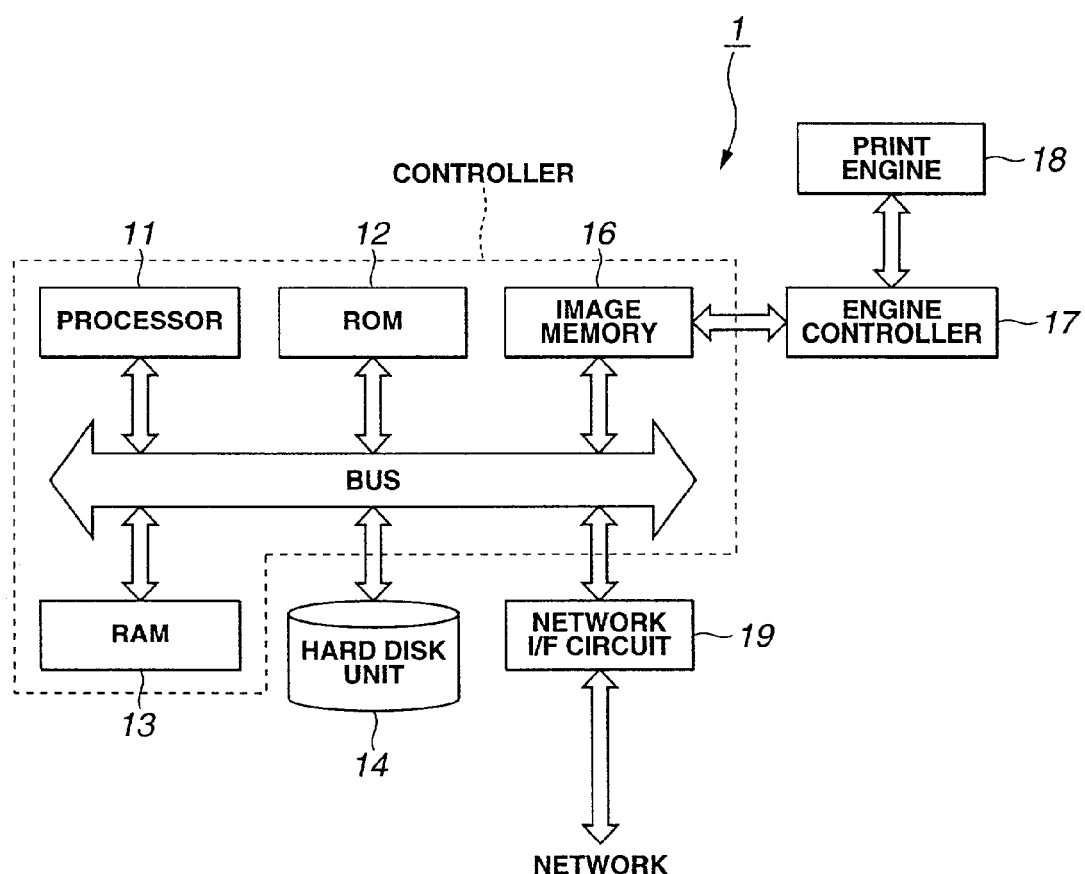
FIG. 13 is a figure showing an example of a hardware configuration of a printer according to the invention.

FIG. 13 is a diagram showing an example of a hardware configuration of a printer according to the present embodiment. In the figure, a processor 11 executes various programs stored in a ROM 12 and RAM 13. That is, the execution of various programs by the processor 11, cooperative with other hardware, permits the printer to realize predetermined functions. This embodiment realizes communication function, spool function, image-generation function, print-control function and job management function, as hereinafter described. A hard disk unit 14 stores the print job data forwarded from a host machine 1 through a network interface circuit 19. The network interface circuit 19 is connected to a not-shown network N to carry out network communication with the host machine. An image memory 16 stores the image data generated on the basis of the print job data. An engine controller 17 reads out the image data loaded in the image memory 16 and supplies it to a print engine 18, while controlling the operation of the print engine 18. The engine controller 17 is started up due to a print execute command, as a trigger, sent from the processor 11 when a predetermined bandwidth of bit map data, for example, is loaded in the image memory 16. The print engine 18 is configured, for example, with a paper feed mechanism and a print head, in order to make printing on a print recording medium, such as a paper. The print engine 18 may be used suited for the kind of a printer, e.g. a laser printer, a serial printer or the like.

Figure 14:
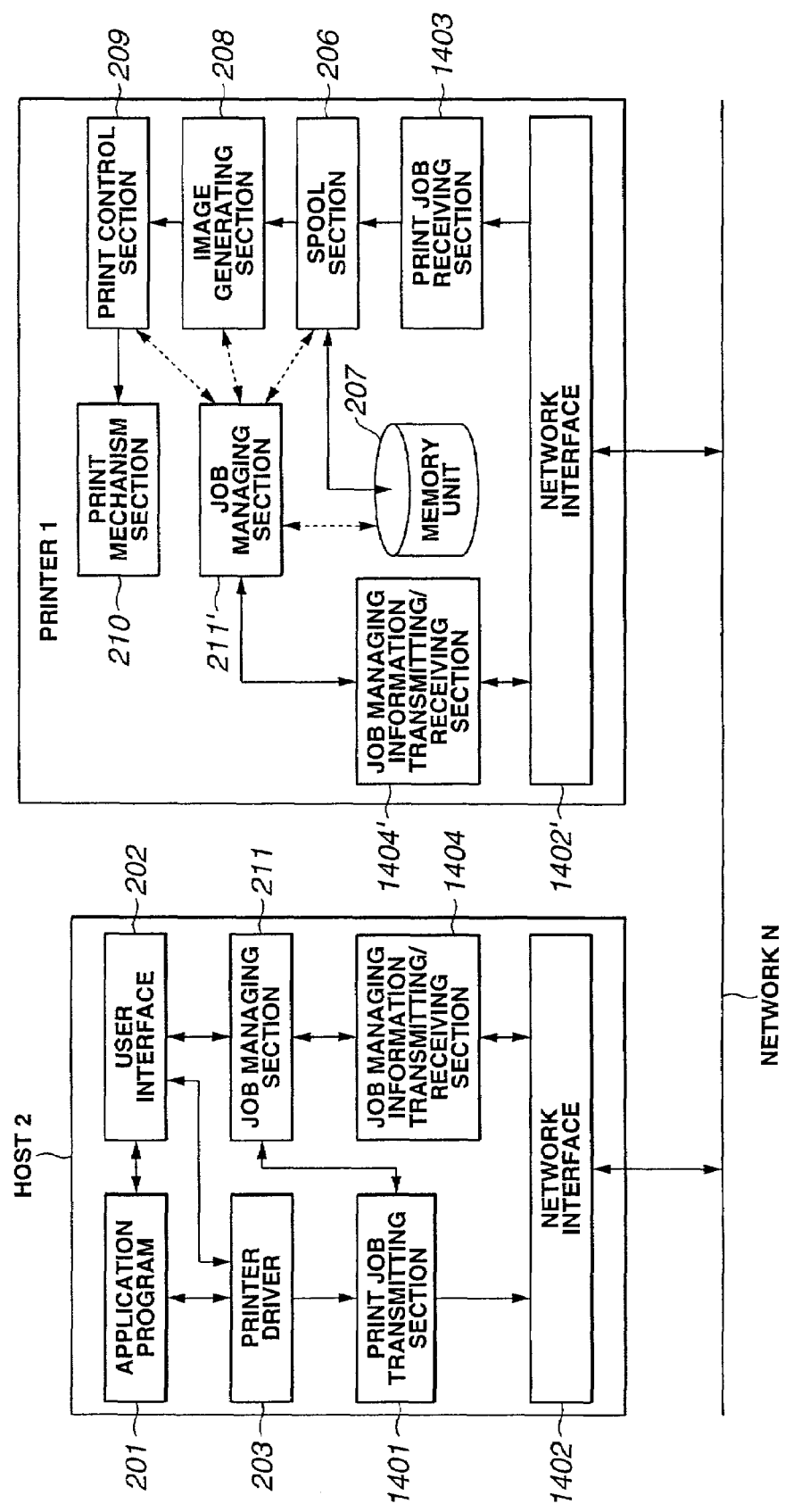
FIG. 14 is a block diagram for explaining the outline of a print system according to the invention.

The foregoing printer is in connection with the host machine 2 through the network N, constituting a print system. FIG. 14 is a diagram for explaining the outline of a print system according to this embodiment. Incidentally, the same figure shows the representative ones of a plurality of host machines and printers connected to the network N.

An application program 201 is, for example, a word processor to create/edit documents, a graphic editor to create/edit figures, or the like. If now a print command is provided from a user through a user interface 202, the application program 201 invokes a printer driver 203.

The printer driver 203 displays a print dialog box through the user interface 202 and prompts the user to enter predetermined setting items. When a print execution command (e.g. selection of "OK" button) is provided from the user through the user interface 202, the printer driver 203 receives application data (printing data) for printing from the application program 201 and converts the application data into print job data for imaging at the inside of the printer, thus outputting it to the print job transmitting section 1401. It is preferred in this case that the printer driver 203 embeds the information related to print job itself (job information) in the output data, in addition to the print commands to be imaged for normal print by the printer. The job information includes, for example, a document name (filename), a user name, and the like.

The print job transmitting section 1401 physically/logically converts the print job data sent from the printer driver 203 and outputs it to a network interface section 1402. That is, the print job transmitting section 1401 realizes a communication service positioned in an upper layer protocol as referred in the network hierarchical model. The network interface section 1402 realizes a communication service as positioned in a lower layer protocol as referred in the network hierarchical model. The network interface section 1402 transmits data toward a network interface section 1402' of the printer through the network N.

The network interface section 1402' provided in the printer analyzes the lower layer protocol data received through the network N and converts it into a higher layer protocol data to be delivered to a print job receiving section 1403. Receiving new print job data from the host machine, the print job receiving section 1403 accepts it as a job thrown in the printer and issues job identifying information (job ID) for this job. That is, the job identifying information is to unambiguously identify a job within the printer. After receiving as a job, the print job receiving section 1403 converts the received upper layer protocol data into the former print job data. In this case, the print job receiving section 1403 extracts the job information added by the printer driver 203 from a predetermined protocol and print job data. The print job receiving section 206 notifies the issued job identifying information and job information to the job managing section 211' and associates the print job data with the job identifying information (e.g. in a form added to the print job data) to output them to the spool section 206. The print job receiving section 1403, after ending the output of the print job data to the spool section 206, notifies the job managing section 211' of a completion of reception.

The spool section 206 outputs the print job data sent from the print job receiving section 1403 to the memory unit 208 and reads out in a predetermined order the print job data stored in the memory unit 208 and outputs it to the image generating section 208. Incidentally, the spool section 206 of this embodiment adopts a mechanism for increasing the speed of data supply to the image generating section 208, as hereinafter referred.

The image generating section 208 images the print job data sent through the spool section 206 and generates image data to be loaded in the image memory. In this case, the image generating section 208 extracts the job identifying information added on the print job data and, if commencing imaging, notifies it to the job managing section 211'. The image generating section 208, after loading the image data in the image memory, notifies a print request to the print control section 209. This print request contains job identifying information. Interpreting the print job data and completing image data generation, the image generating section 208 notifies it to the job managing section 211'.

The print control section 209 instructs the print mechanism section 210 to prepare for print on the basis of the print request and notifies the job identifying information to the job managing section 211'. Accepting a completion of print preparation from the print mechanism section 210, the print control section 209 reads out the image data loaded in the image memory and supplies it to the print mechanism section 210. The print mechanism section 210 carries out printing to a print-recording medium on the basis of the supplied image data. After supplying the image data for the job identifying information, the print control section 209 if receiving a notification of page discharge completion from the print mechanism section 210 notifies a print completion to the job managing section 211.

The job managing section 211 implemented in the host machine 2 communicates with the job managing section 211' implemented in the printer 1 through the job managing information transmitting/receiving sections 1404, 1404' according to a predetermined protocol, thereby managing the job within the printer. That is, the job managing section 211' is an execution entity to manage the job based on the print job data thrown in the printer. The job managing information transmitting/receiving sections 1404, 1404' realize a communication service typically with a protocol different from the communication of the print job data. More specifically, the job managing section 211 receives an instruction from the user through the user interface 202 and forwards it as a job manage request to the job managing section 211' in the printer. The job managing section 211' in the printer carries out a process according to the received job manage request. For example, where receiving a delete request for a particular job, the job managing section 211' deletes all the data for the particular job existing in the printer. On the other hand, the job managing section 211' receives a progress situation from the print job receiving section 1403, image generating section 207 and print control section 209 and notifies it to the job managing section 211 in the host machine.

Figure 15:
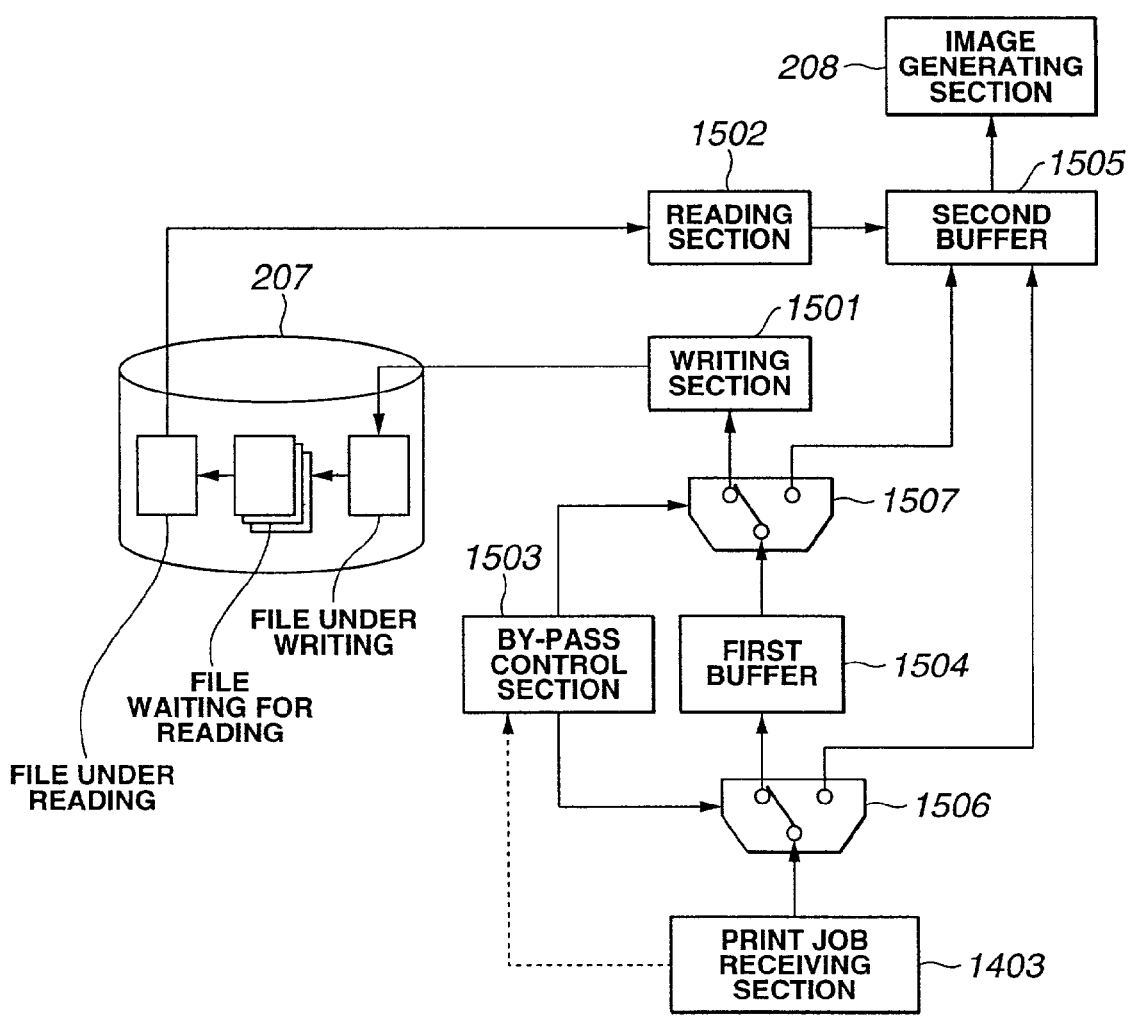
FIG. 15 is a block diagram for explaining the detail of the spool section.

FIG. 15 is a block diagram for explaining the detail of the spool section according to this embodiment. The spool section 206 typically writes the print job data received from the print job receiving section 1403 to the memory unit 207 by a writing section 1501 and reads in a first-in-first-out order the print job data stored in the memory unit 207 by a reading section 1502 to output it to the image generating section 208. It is noted in this embodiment that the spool section 206 is configured to supply print job data depending on a vacancy situation of the buffer provided in the forward and backward stage of the memory unit 207 without passing through the memory unit 207.

The print job receiving section 1403, if receiving data from the network interface section 1402, makes notification to a by-pass control section 1503. The by-pass control section 1503 determines whether or not there exists a memory block under use in a first buffer 1504 or whether or not there exists a vacant memory block in a second buffer 1505, or whether or not there exists a remaining file in the memory unit 207.

Where there is a memory block under use in the first buffer, there is a remaining file in the memory unit 207 or there is no vacant block in the second buffer memory 1503, the by-pass control section 1503 controls the selector 1506 and 1507 to supply data by way of the memory unit 207.

On the other hand, where there is a memory block under use in the first buffer 1504, there is a vacant block in the second buffer memory 1505 and there is no remaining file in the memory unit 207, the by-pass control section 1503 controls the selector 1506 to directly supply data to the second buffer. Furthermore, the by-pass control circuit 1503 controls the selectors 1506 and 1507 to supply data to the second buffer by way of the first buffer 1504 when there becomes no vacant memory block existing in the second buffer 1505. When there becomes no vacant memory block in the first buffer 1504, the by-pass control section 1503 controls selector 1506 to supply data by way of the memory unit 207.

Figure 16:
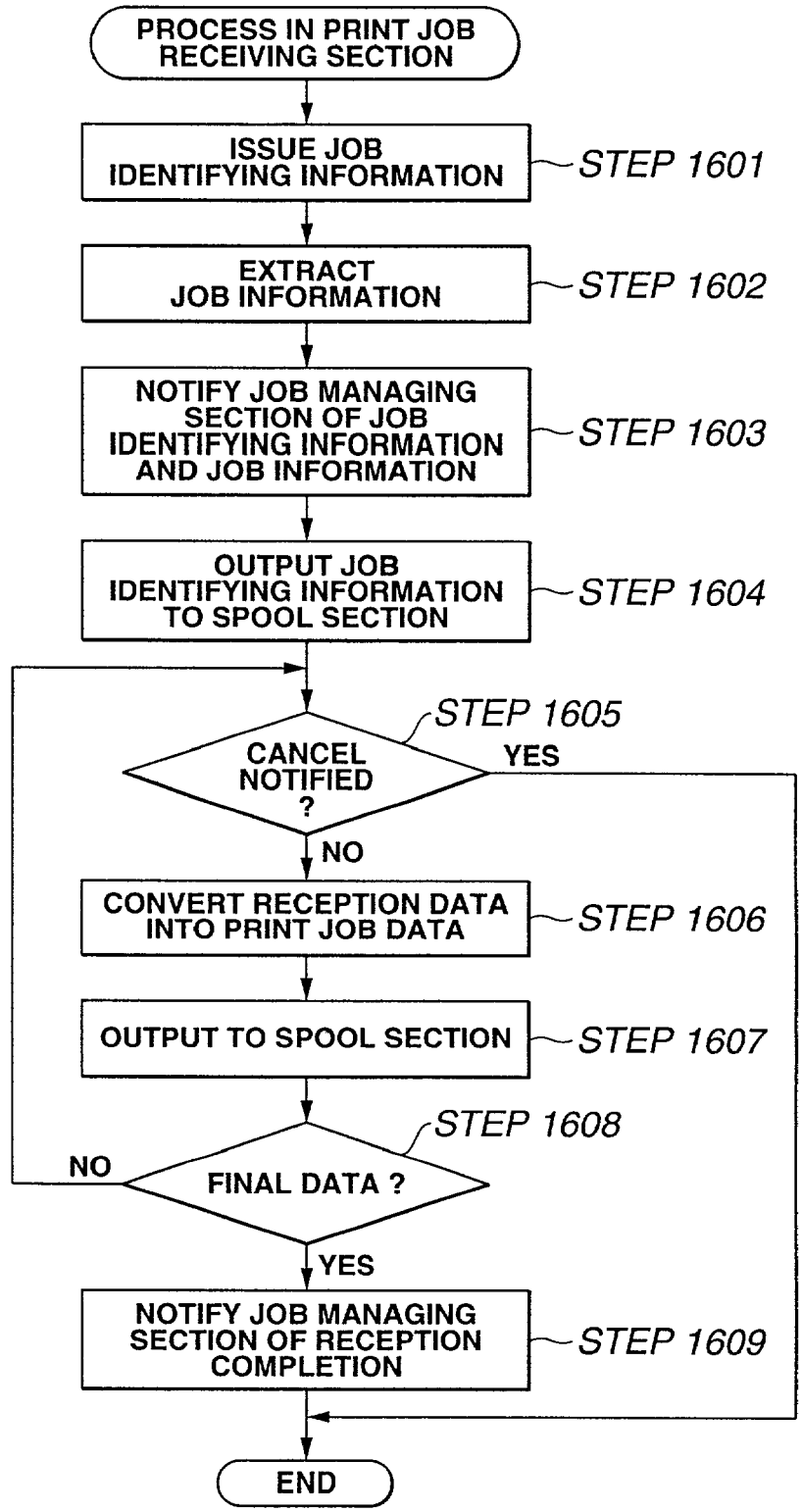
FIG. 16 is a flowchart for explaining the operation of a print job receiving section.

FIG. 16 is a flowchart for explaining the operation of the print job receiving section 1403 according to this embodiment. The print job receiving section 1403 is started up upon receiving new data from the network interface section 1402'. The print job receiving section 1403 first issues job identifying information (STEP 1601) and extracts job information from the print job data (STEP 1602). Next, the print job receiving section 1403 notifies the issued job identifying information and job information to the job managing section 211' (STEP 1603) and outputs job identifying information to the spool section 206 (STEP 1604). The print job receiving section 1403, after determining whether a cancel command for the relevant job has been notified or not (STEP 1605), converts the received data into print job data (STEP 1606) and outputs it to the spool section 206 (STEP 1607). The print job receiving section 1403, where determining that a cancel command for that job has been notified, ends the process for the job. The print job receiving section 1403 repeats the process of the STEPs 1605 to 1607 until the final data of the print job data is outputted to the spool section 206. The print job receiving section 1403, where determining that the final data has been outputted to the spool section 206 (Yes of STEP 1608), notifies the job managing section 211' of a completion of reception and ends the process (STEP 1609).

Figure 17:
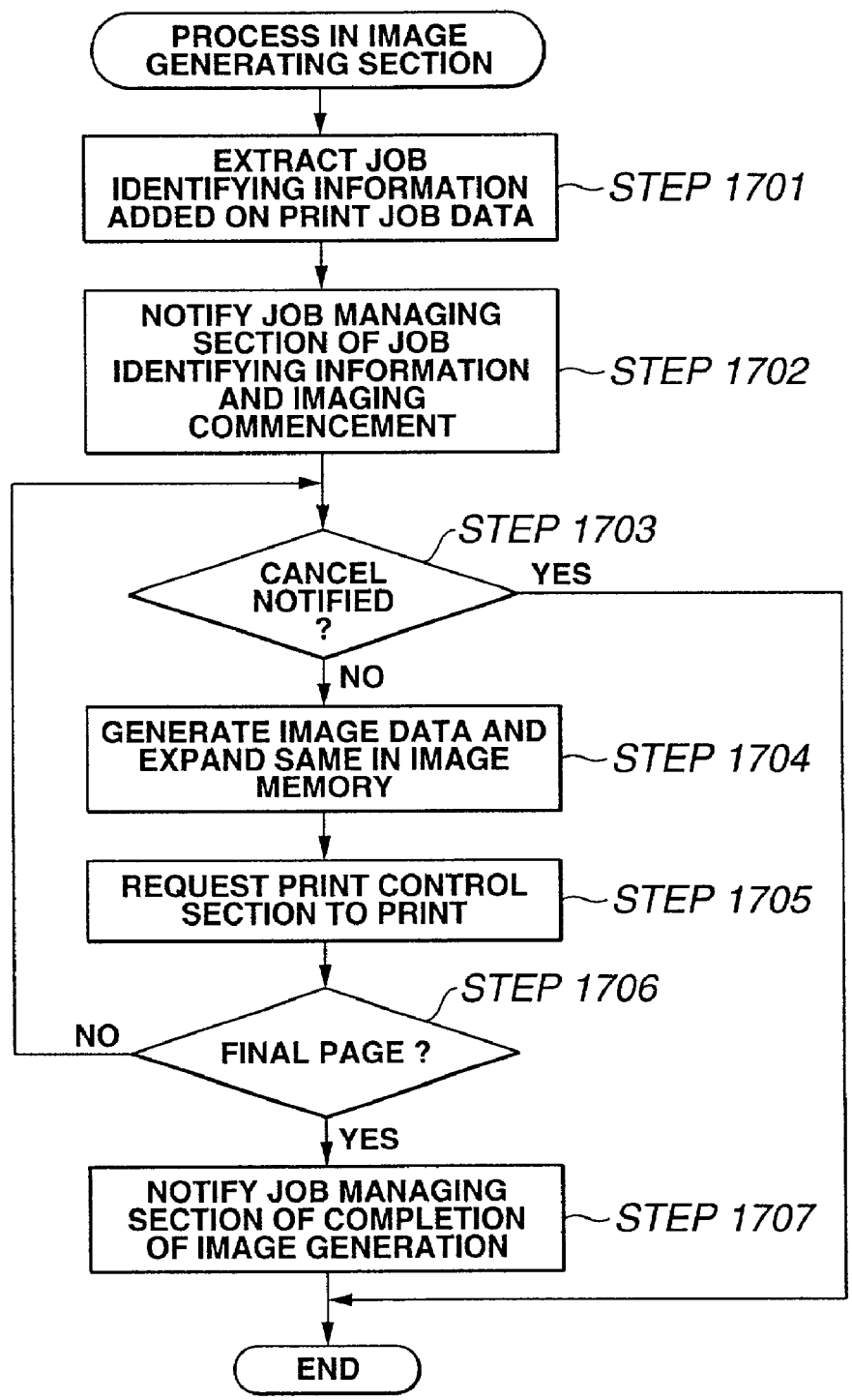
FIG. 17 is a flowchart for explaining the operation of an image generating section.

FIG. 17 is a flowchart for explaining the operation of the image generating section 208 according to this embodiment. The image generating section 208 is started up upon receiving newly print job data through the spool section 206. The image generating section 207 first extracts job identifying information from the received print job data (STEP 1701) and notifies the job managing section 211' of the job identifying information and a commencement of imaging (STEP 1702). Next, the image generating section 208 determines whether a cancel command for the relevant job has been notified or not (step 1703), and thereafter interprets the print job data to generate image data and load it in the image memory (STEP 1704). loading the image memory in a predetermined bandwidth amount (e.g. an amount of one page), the image generating section 208 forwards a print request to the print control section 209 (STEP 1705). Due to this, the image data loaded in the image memory is to be read under control of the print control section 209. The image generating section 208 repeats the process of the STEPs 1703 to 1705 based on the print job data until generating image data. Incidentally, the image generating section 208, where determining that a cancel command for the relevant job has been notified, ends the process for that job. The image generating section 208, where determining that the final data has been generated (Yes in STEP 1706), notifies the job managing section 211' of a completion of image generation and ends the process (STEP 1707).

Figure 18:
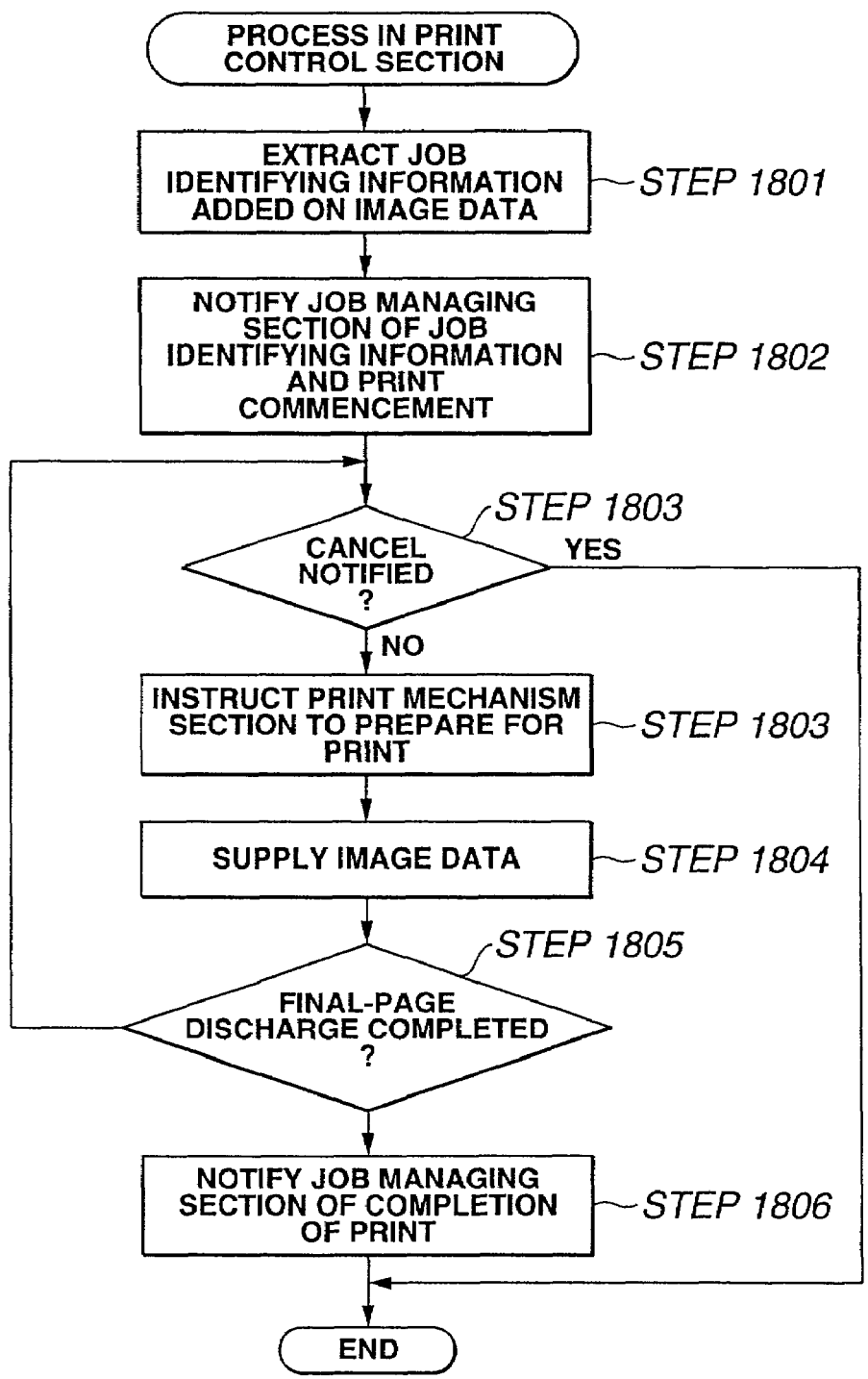
FIG. 18 is a flowchart for explaining the operation of a print control section.

FIG. 18 is a flowchart for explaining the operation of the print control section 209 according to this embodiment. The print control section 209 is started up upon receiving a print request from the image generating section 208. Receiving a print request from the image generating section 208, the print control section 209 first extracts the job identifying information added on the image data (STEP 1801) and notifies the job managing section 211' of this job identifying information and a commencement of print (STEP 1802). The print control section 209, after determining whether a cancel command for the relevant job has been notified or not (STEP 1803), instructs the print mechanism section 210 to prepare for print (STEP 1804), receives a completion of print preparation sent from the print mechanism section 210 and reads out image data out of the image memory and supplies it to the print mechanism section 210 (STEP 1805). The print control section 209 repeats the process of the STEPs of 1803 to 1805 until receiving a completion of final-page discharge from the print mechanism section 210. Receiving a completion of final-page discharge from the print mechanism section 210 (Yes in STEP 1806), the print control section 209 notifies an end of print to the job managing section 211'.

As described above, the print job receiving section 1403, the image generating section 208 and the print control section 209 of this embodiment notify their own progress statuses to the job managing section 211'. This allows the job managing section 211' to manage the progress statuses of the jobs thrown in the printer, in respect of the processes of reception, image generation and print.

FIG. 19 is a figure for explaining a job progress status. As shown in the figure, the job progress statuses in this embodiment are represented in eight states. That is, the job progress statuses include two states of "receiving" and "done" in the reception process, three states of job "waiting", "imaging" and "done" in the image generating process, and three states of job "waiting", "printing" and "done" in the print process.

The job managing section 211' holds a job managing table in order to manage the progress status of a job on a job-by-job basis. FIG. 20 is a figure showing an example of a job management table. As shown in the figure, the jobs thrown in the printer are held in their progress statuses on a job-identifying-information basis. Incidentally, the job management table may hold not only the job progress statuses but also detailed information about the jobs. The job detailed information includes, for example, print count, toner consuming quantity, error information and so on.

Figure 21:
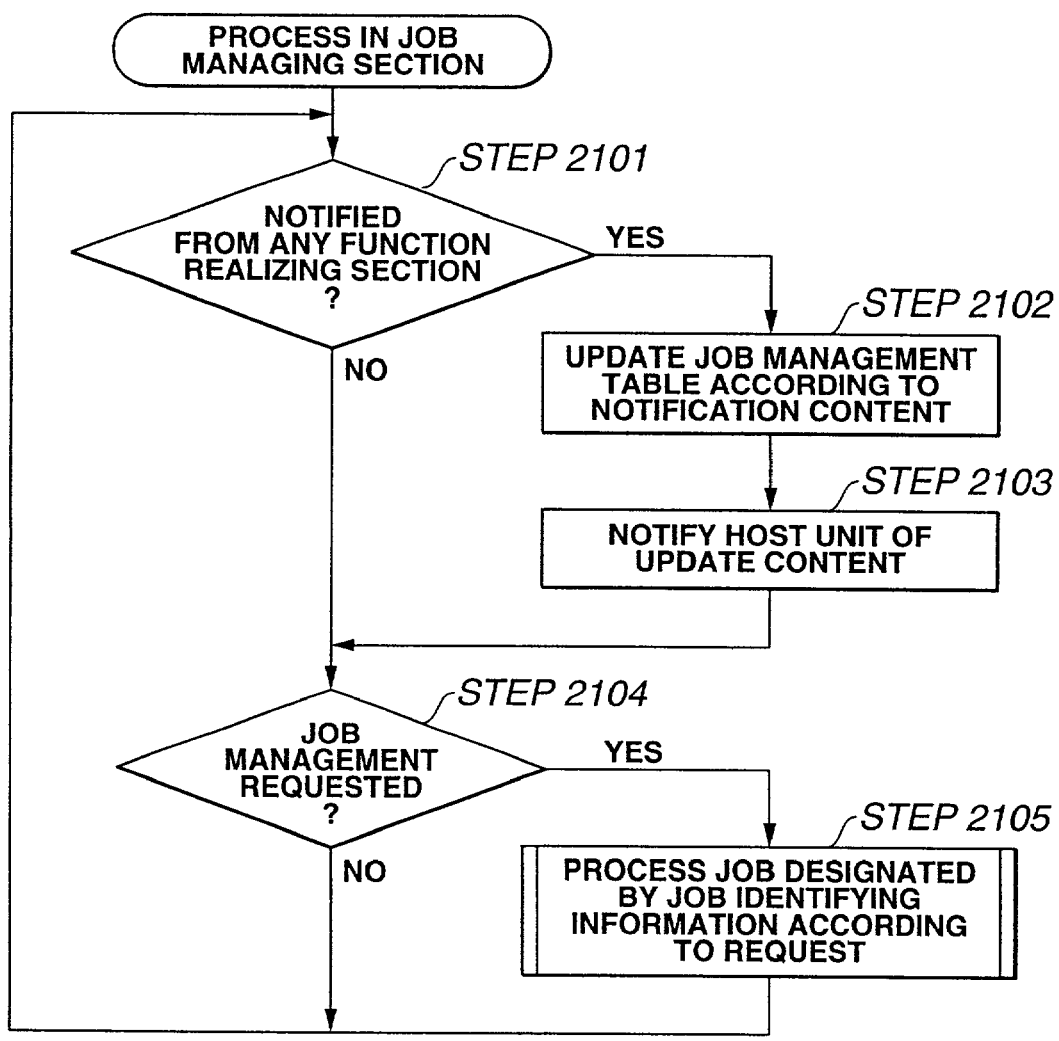
FIG. 21 is a flowchart for explaining the operation of a job managing section.

FIG. 21 is a flowchart for explaining the operation of the job managing section 211' according to the embodiment. Receiving a notification from any of the print job receiving section 1403, the image generating section 208 and the print control section 209 (Yes in STEP 2101), the job managing section 211' updates the job management table according to a content of the notification (STEP 2102). For example, if receiving job identifying information and job information from the print job receiving section 1403, the job managing section 211' registers the job to the job management table to change a progress status of the job into a "receiving" state. After updating the job management table, the job managing section 211' notifies the host machine 2 of the update content as job management information (STEP 2103). The job managing section 211 in the host machine 2, when accepting this job management information, controls to make job management display on the user interface section 202.

Meanwhile, the job managing section 211' if accepting a job-manage request from the host machine 2 (Yes in STEP 2104) specifies job identifying information from the job information contained in the job-manage request and makes a process meeting the request for the job designated by the job identifying information. For example, where the job-manage request is a request to acquire job management information, the job managing section 211' notifies a job management table content to the requesting host machine 2. Meanwhile, where the job-manage request is a request for job cancellation (print suspension), the job managing section 211' controls to delete all the data concerned with the job existing in the printer.

Figure 22:
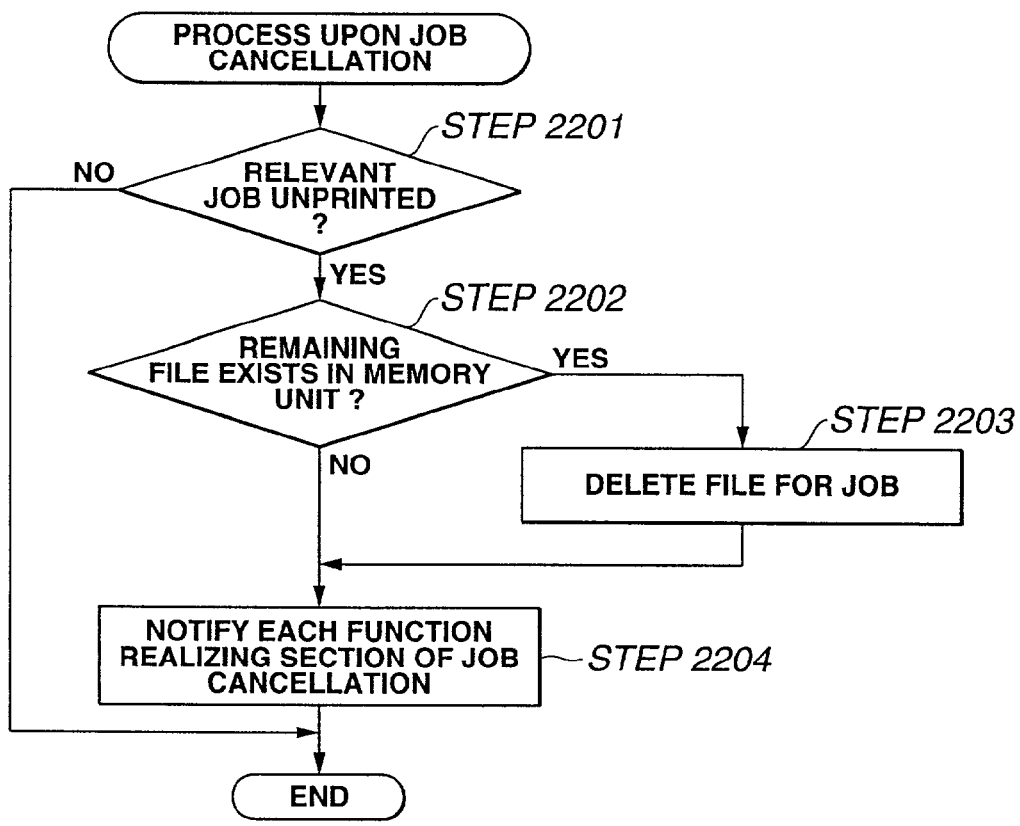
FIG. 22 is a flowchart for explaining the operation upon job cancellation in the job managing section.

FIG. 22 is a flowchart for explaining the operation upon job cancellation by the job managing section 211' according to the present embodiment. In the figure, receiving a job cancellation as a job-manage request from the host machine 2, the job managing section 211' makes reference to the job management table and determines whether the job to be cancelled is completed of printing or not (STEP 2201). The job managing section 211', where determining the job is not yet completed in printing, inquires the spool section 206 whether there is print job data, as a file, for the relevant job in the memory unit 207 or not (STEP 2202). The spool section 206, where determining that a remaining file exists in the memory unit 207, deletes the relevant file (STEP 2203). Then, the job managing section 211' notifies a cancel command to the print job receiving section 1403, image generating section 208 and print control section 209 (STEP 2204). The cancel command contains job identifying information for the job to be cancelled. The notified print job receiving section 1403, image generating section 208 and print control section 209 do not process the data concerned with the job designated by the job identifying information. Incidentally, it is preferred that the job managing section 211' first notifies a cancel command to the print control section 209. This is due to physically reducing the consumption of expendable supplies, such as papers, to a minimum extent.

Next, explanation is made on an example of job management by the job managing section 211, 211' according to this embodiment.

FIG. 23 is a figure showing an example of a job management screen displayed on the user interface section 202. In this embodiment, a job management screen is displayed on a Web browser. In the figure, a job list area 2301 is to display a progress state for each job thrown in the printer. Also, a detailed information area 2302 is to display the detailed information on the job highlight-displayed in the job list area 2301. Furthermore, an expendables information area 2303 is to display a consuming amount of expendables, such as papers and toner, due to the job. An error information area 2304 is to display, when an error occurs, a report on that error.

Herein, it is assumed that paper jam occurs in the print mechanism section 210 of the printer. The print mechanism section 210 notifies the job managing section 211' of error information concerning paper jam. The job managing section 211' registers the error information in the job management table and notifies the job managing section 211 in the host machine 2 through the network N. The job managing section 211 controls to display an error report for the job in the error information area 2304 as shown in FIG. 24. The user is allowed to grasp an error status in the printer through the user interface 202 of the host machine 2 by making reference to the error report. If the user selects a "Job Cancel" button arranged in a lower right of the screen in order to cancel the job, a job manage request as a request to cancel the job is transmitted to the job managing section 211'. The job managing section 211' receives this job manage request and notifies a job cancel command to each of the function realizing section mentioned before.

As described above, according to the present embodiment, job identifying information is issued for the jobs thrown in the printer. Accordingly, even where a plurality of jobs exist in the printer, it is possible to unambiguously identify a job on the basis of job identifying information.

Also, according to the present embodiment, the status of a job process to be identified by job identifying information is notified to the host machine and displayed on the screen. Thus, the user is allowed to grasp the status of progress thereof.

Furthermore, according to the embodiment, it becomes possible to make a predetermined process, such as cancellation, for a particular job identified by job identifying information.

The foregoing embodiment is a mere example for explaining the invention and not intended to limit the invention to this embodiment. The invention can be implemented in various forms as long as not departing from the gist.

For example, the above embodiment can be modified in the following manners.

(1) In order to notify job identifying information between the function realizing sections, it may be delivered as a subtraction number in subroutine (function) call or as a message. Also, each function realizing section may be configured to make reference to a shared memory area, such as a job management table. Furthermore, job identifying information may be added to each of data for the job.

(2) Although the present embodiment explained on job cancellation as an example of job management, the job management is not especially limited. For example, the spool data (print job data) stored in the memory unit 207 is replaced in print order, or the spool data may be deleted.

Also, although in the above embodiment the function realizing sections were explained on a sequential operation basis, the invention is not especially limited to this. Accordingly, the processes may be changed in the order or configured for concurrent operation.

Incidentally, in the present specification, means does not merely signify physical means but includes a case that the function possessed by the means is realized by software. Also, the function possessed by one means may be realized by two or more physical means or the function of two or more means may be realized by one physical means.

The invention claimed is:

1. A printer to be connected to a host machine, comprising:
    job accepting means for accepting a series of reception data via a RAW-mode physical channel from said host machine, wherein the series of reception data comprises a plurality of print job data, and wherein the plurality of print job data comprises a plurality of print jobs in succession;
    extracting means that extracts a print job in the plurality of print jobs from the series of reception data to create an accepted job, wherein extracting the print job comprises:
        accepting data in the series of reception data from a start-end pattern data to an end-edge pattern data to obtain accepted data; and
        grouping the accepted data into the accepted job;
    assigning means for issuing identifying information for the accepted job and assigning the issued identifying information;
    job managing means for managing the accepted job on the basis of the identifying information to obtain a managed job;
    generating means for generating, as a process for the job, image data on the basis of the managed job; and
    print means for control to print on a print recording medium on the basis of the generated image data.

2. The printer according to claim 1, further comprising spool means for storing the print job data assigned with the job identifying information to be outputted in a predetermined order, said generating means interpreting the print job data to be outputted from said spool means and generating image data.

3. The printer according to claim 1, wherein said extracting means searches for predetermined language identifying information from among the series of reception data and specifies a language kind of the print job data to be extracted.

4. The printer according to claim 3, wherein said extracting means extracts print job data from among the series of reception data on the basis of end-edge pattern data corresponding to the specified language kind.

5. A printer to be connected to a host machine, comprising:
    job accepting means for accepting a print job from a plurality of print job data sent as a series of reception data via a RAW-mode physical channel from said host machine;
    extracting means that extracts the print job data on a job-unit basis from the series of reception data;

assigning means for issuing identifying information for the accepted job and assigning the issued identifying information;

generating means for generating, as a process for the job, image data on the basis of the print job data;

print means for control to print on a print recording medium on the basis of the generated image data as a process for the job; and job managing means for managing the accepted job on the basis of the identifying information, wherein said assigning means assigns identifying information containing interface identifying information representative of a kind of the exclusive interface.

6. The printer according to claim 1, further comprising job manage request accepting means for accepting a job manage request containing identifying information from said host machine.

7. The printer according to claim 6, wherein said job managing means specifies a predetermined job on the basis of identifying information contained in the accepted job manage request.

8. The printer according to claim 7, wherein said job managing means controls at least any of said job accepting means, said generating means and said printing means to suspend from processing the job specified on the basis of the identifying information where the accepted job manage request is a cancel request.

9. The printer according to claim 8, wherein the respective ones of said job manage request accepting means, said generating means and said printing means process for a job other than the specified job where controlled by said job managing means to suspend a process for the specified job.

10. The printer according to claim 9, wherein said job managing means controls said printing means before controlling said job accepting means and said generating means.

11. The printer according to claim 6, wherein at least any of said job manage request accepting means, said generating means and said printing means notifies said job managing means of a status of a process for the job.

12. The printer according to claim 11, wherein job managing means notifies a predetermined host machine of the status of a process notified from at least any of said job accepting means, said generating means and said printing means.

13. The printer according to claim 1, wherein said RAW-mode physical channel is at least one selected from a serial interface, a parallel interface and a USB interface.

14. The printer according to claim 2, wherein said extracting means searches for predetermined language identifying information from among the series of reception data and specifies a language kind of the print job data to be extracted.

15. The printer according to claim 2, wherein said RAW-mode physical channel is at least one selected from a serial interface, a parallel interface and a USB interface.

16. The printer according to claim 3, wherein said RAW-mode physical channel is at least one selected from a serial interface, a parallel interface and a USB interface.

17. The printer according to claim 4, wherein said RAW-mode physical channel is at least one selected from a serial interface, a parallel interface and a USB interface.

18. The printer according to claim 5, wherein said RAW-mode physical channel is at least one selected from a serial interface, a parallel interface and a USB interface.

19. The printer according to claim 6, wherein said RAW-mode physical channel is at least one selected from a serial interface, a parallel interface and a USB interface.

20. The printer according to claim 7, wherein said RAW-mode physical channel is at least one selected from a serial interface, a parallel interface and a USB interface.

21. The printer according to claim 8, wherein said RAW-mode physical channel is at least one selected from a serial interface, a parallel interface and a USB interface.

22. The printer according to claim 9, wherein said RAW-mode physical channel is at least one selected from a serial interface, a parallel interface and a USB interface.

23. The printer according to claim 10, wherein said RAW-mode physical channel is at least one selected from a serial interface, a parallel interface and a USB interface.

24. The printer according to claim 11, wherein said RAW-mode physical channel is at least one selected from a serial interface, a parallel interface and a USB interface.

25. The printer according to claim 12, wherein said RAW-mode physical channel is at least one selected from a serial interface, a parallel interface and a USB interface.

26. The printer according to claim 5, further comprising spool means for storing the print job data assigned with the job identifying information to be outputted in a predetermined order, said generating means interpreting the print job data to be outputted from said spool means and generating image data.

27. The printer according to claim 5, wherein said extracting means searches for predetermined language identifying information from among the series of reception data and specifies a language kind of the print job data to be extracted.

28. The printer according to claim 27, wherein said extracting means extracts print job data from among the series of reception data on the basis of end-edge pattern data corresponding to the specified language kind.

* * * * *